US012311692B2

(12) United States Patent
Hoffmuller et al.

(10) Patent No.: US 12,311,692 B2
(45) Date of Patent: May 27, 2025

(54) OPTICALLY VARIABLE SECURITY ELEMENT, PRODUCTION PROCESS AND EMBOSSING ARRANGEMENT

(71) Applicant: GIESECKE+DEVRIENT CURRENCY TECHNOLOGY GMBH, Munich (DE)

(72) Inventors: Winfried Hoffmuller, Bad Tolz (DE); Tobias Sattler, Holzkirchen (DE); Andreas Rauch, Ohlstadt (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 0 days.

(21) Appl. No.: 18/552,234

(22) PCT Filed: Jan. 12, 2022

(86) PCT No.: PCT/EP2022/025010
§ 371 (c)(1),
(2) Date: Sep. 25, 2023

(87) PCT Pub. No.: WO2022/199884
PCT Pub. Date: Sep. 29, 2022

(65) Prior Publication Data
US 2024/0165986 A1 May 23, 2024

(30) Foreign Application Priority Data
Mar. 25, 2021 (DE) ..................... 10 2021 001 582.7

(51) Int. Cl.
*B42D 25/425* (2014.01)
*B42D 25/324* (2014.01)
*B42D 25/36* (2014.01)

(52) U.S. Cl.
CPC ......... *B42D 25/425* (2014.10); *B42D 25/324* (2014.10)

(58) Field of Classification Search
CPC ..... B42D 25/425; B42D 25/324; B42D 25/36
(Continued)

(56) References Cited

U.S. PATENT DOCUMENTS 10,809,622 B2 10/2020 Nees et al.
11,155,427 B2 10/2021 Triepel et al.
(Continued)

FOREIGN PATENT DOCUMENTS

DE 102009031386 A1 1/2011
DE 102016109044 B3 7/2017
(Continued)

OTHER PUBLICATIONS

German Search Report from corresponding German Patent Application No. DE102021001582.7, Sep. 28, 2021.
(Continued)

*Primary Examiner* — Justin V Lewis
(74) *Attorney, Agent, or Firm* — Workman Nydegger

(57) ABSTRACT

An optically variable security element is provided for safeguarding articles of value. The security element has a feature layer containing, in a common plane, first and second feature regions arranged so as to accurately fit together. The first feature regions contain a first embossing lacquer layer of a first embossing lacquer into which an embossed structure that creates a first optical effect has been embossed. The second feature regions contain a second embossing lacquer layer of a second embossing lacquer into which an embossed structure that creates a second, different optical effect has been embossed. The first and second embossing lacquers have different solidification properties and different optical properties. A production process is provided for such an
(Continued)

optically variable security element, and to embossing arrangements comprising a semi-finished security element product and means of impressing an embossed structure.

20 Claims, 12 Drawing Sheets

(58) Field of Classification Search
USPC ................................ 283/67, 72, 94, 98, 901
See application file for complete search history.

(56) References Cited

U.S. PATENT DOCUMENTS

| | | | | |
|---|---|---|---|---|
| 11,623,465 | B2 | 4/2023 | Scherer et al. | |
| 11,654,709 | B2 | 5/2023 | Scherer et al. | |
| 2017/0343900 | A1 | 11/2017 | Nees et al. | |
| 2019/0210823 | A1 | 7/2019 | Triepel et al. | |
| 2021/0268825 | A1 | 9/2021 | Scherer et al. | |
| 2021/0283939 | A1 | 9/2021 | Scherer et al. | |
| 2022/0314681 | A1 * | 10/2022 | Rauch | B42D 25/43 |

FOREIGN PATENT DOCUMENTS

| | | | | |
|---|---|---|---|---|
| DE | 102019003947 | A1 | 12/2020 | |
| EP | 2591922 | A1 | 5/2013 | |
| EP | 3230795 | B1 | 6/2019 | |
| WO | 2020011390 | A1 | 1/2020 | |
| WO | 2020011391 | A1 | 1/2020 | |
| WO | 2020011392 | A1 | 1/2020 | |
| WO | WO-2020244806 | A1 * | 12/2020 | B42D 25/324 |

OTHER PUBLICATIONS

International Search Report from corresponding PCT Application No. PCT/EP2022/025010, Jun. 10, 2022.

* cited by examiner

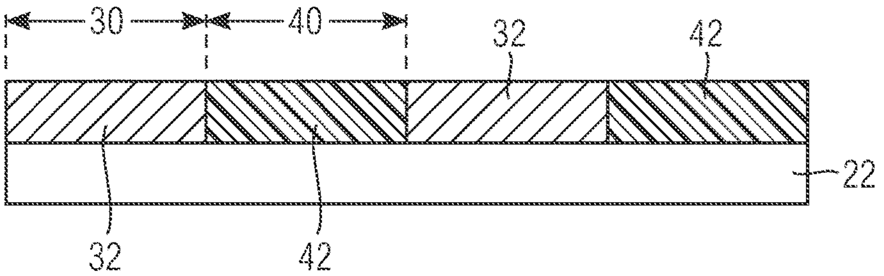
Fig. 4(a)
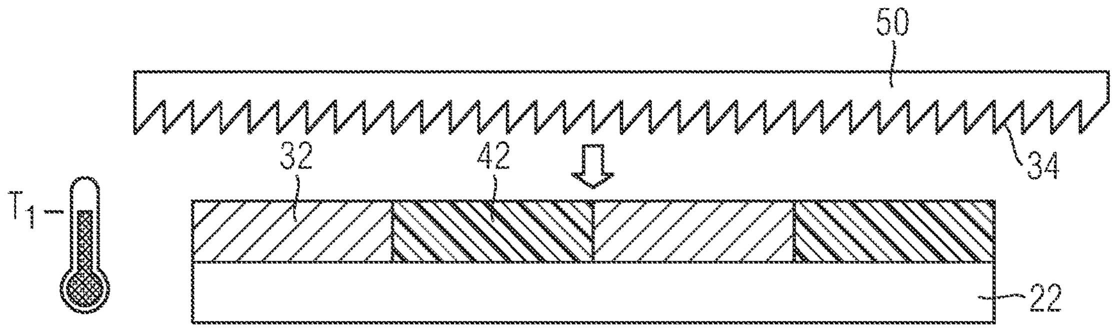
Fig. 4(b)
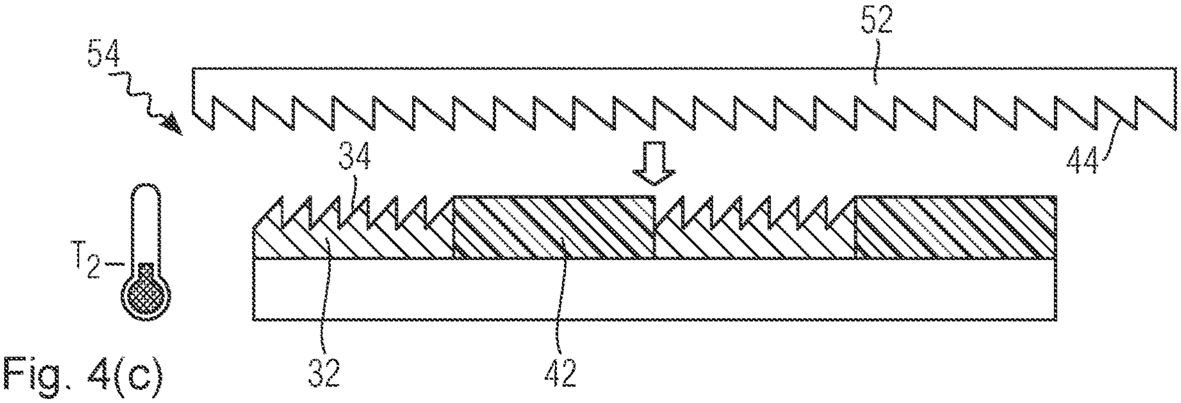
Fig. 4(c)
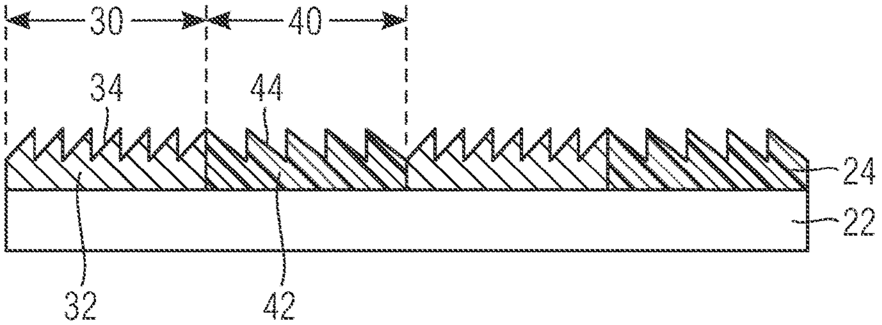
Fig. 4(d)
Fig. 4

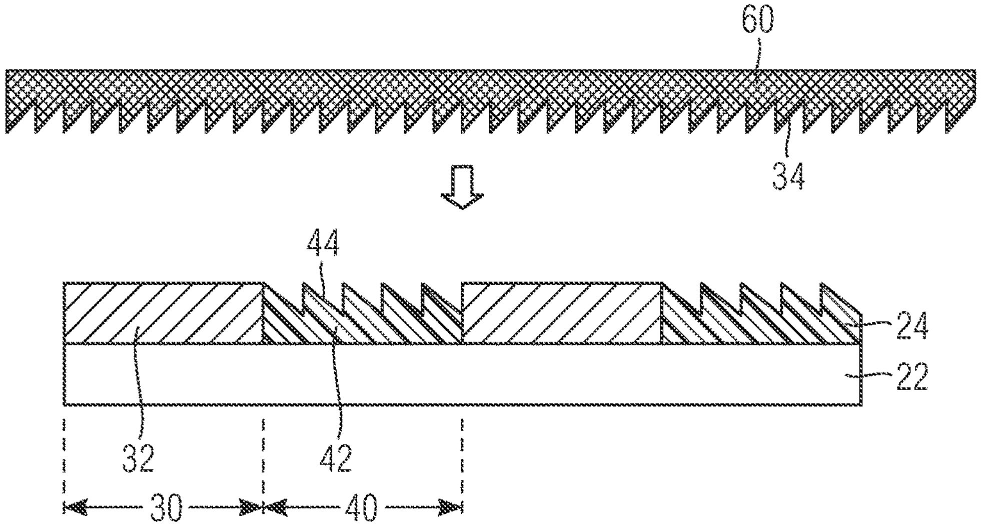
Fig. 5(a)
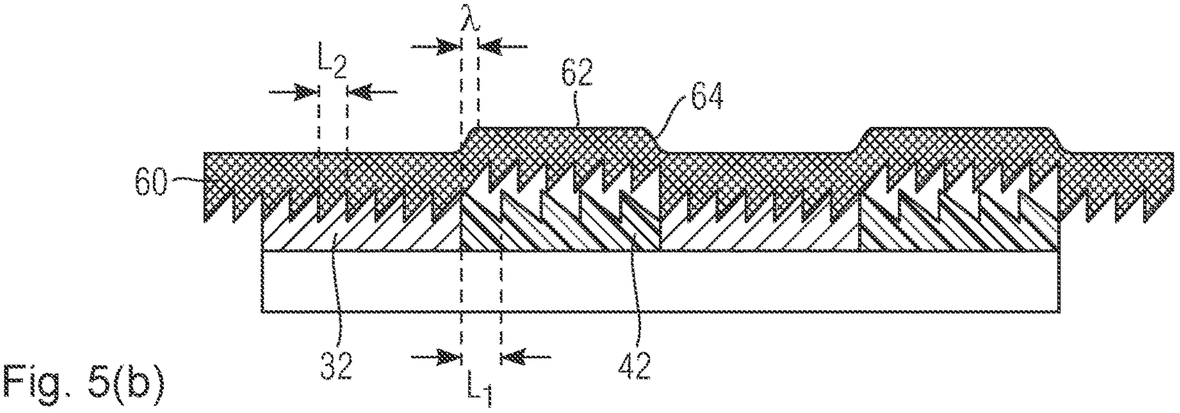
Fig. 5(b)
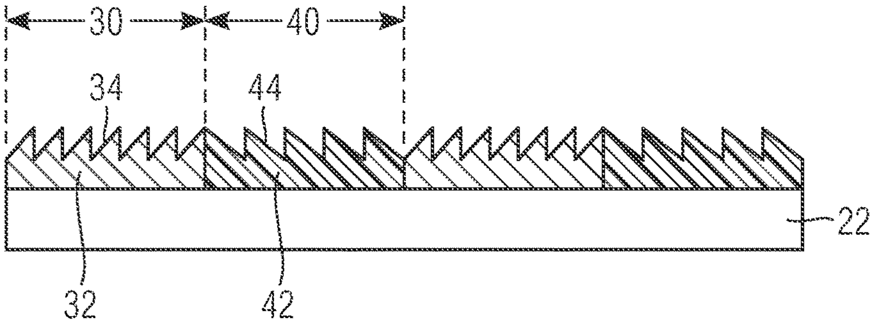
Fig. 5(c)
Fig. 5

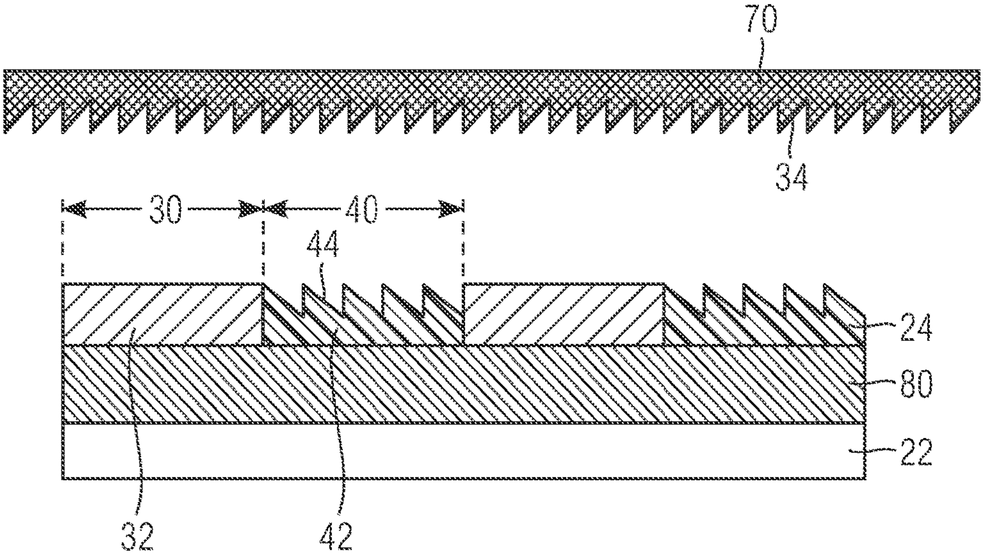
Fig. 7(a)
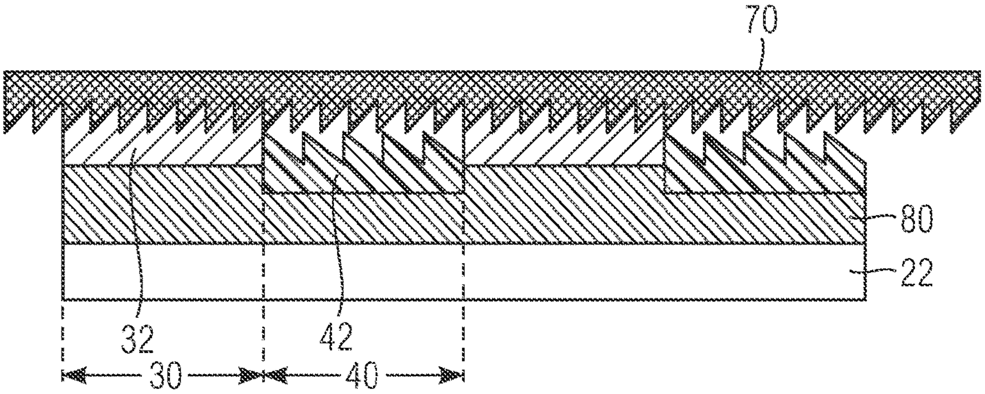
Fig. 7(b)
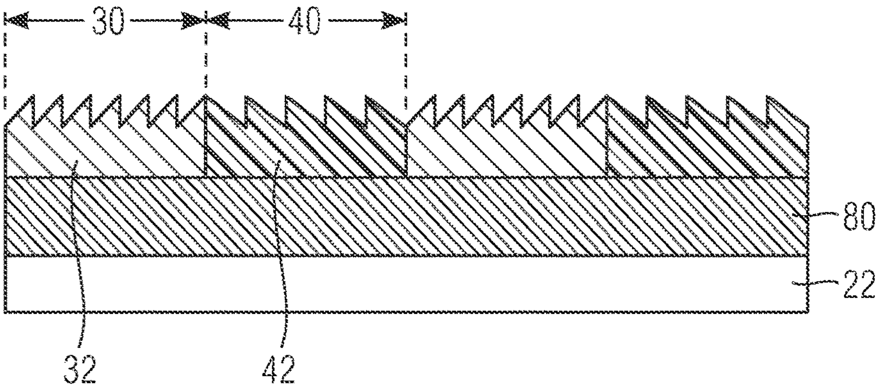
Fig. 7(c)
Fig. 7

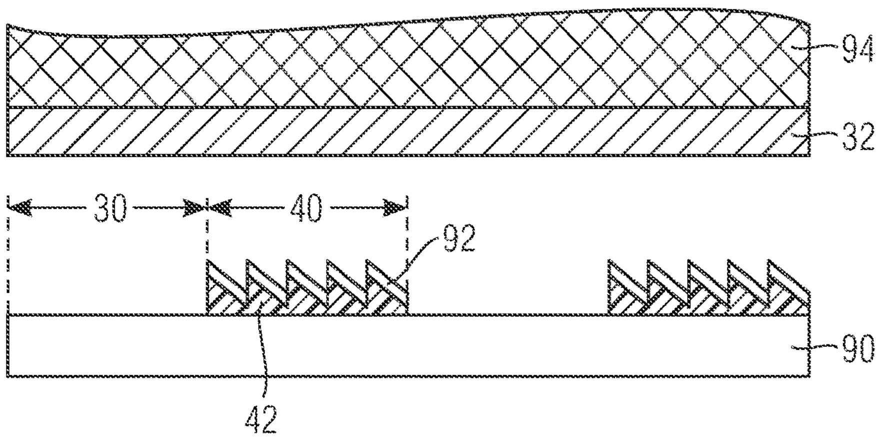
Fig. 9(a)
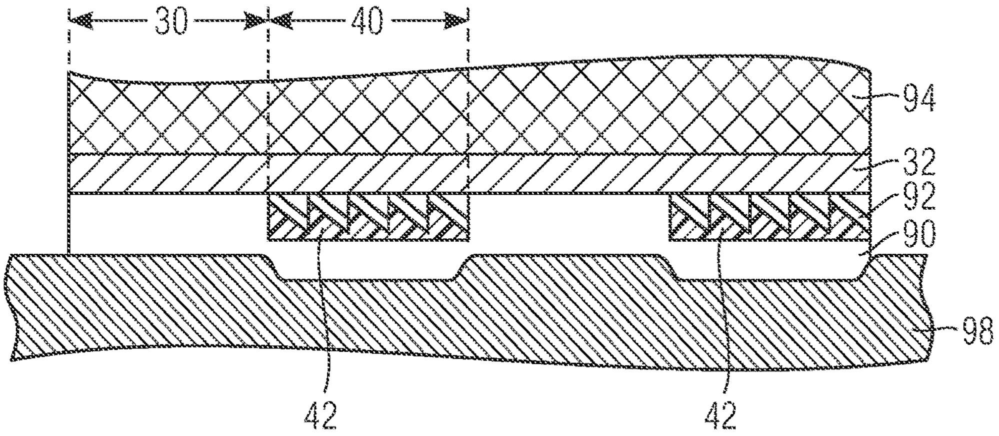
Fig. 9(b)
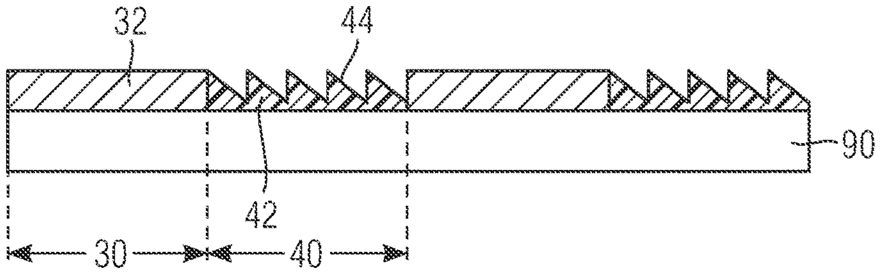
Fig. 9(c)
Fig. 9

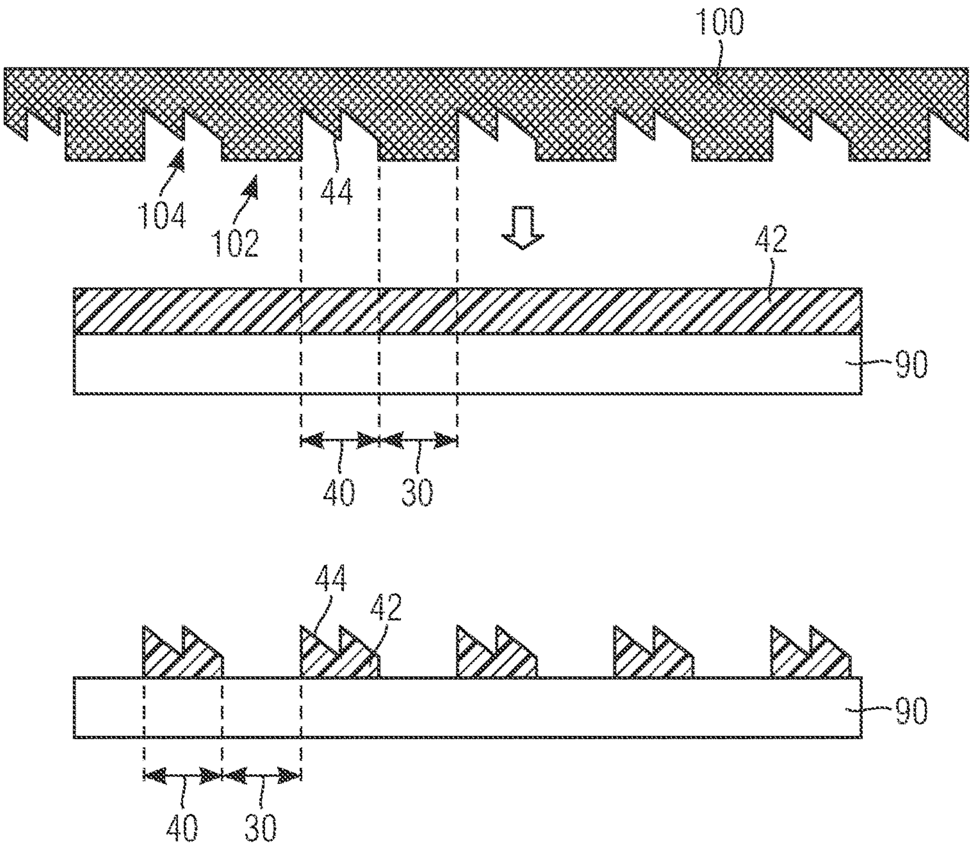
Fig. 11(a)
Fig. 11(b)
Fig. 11
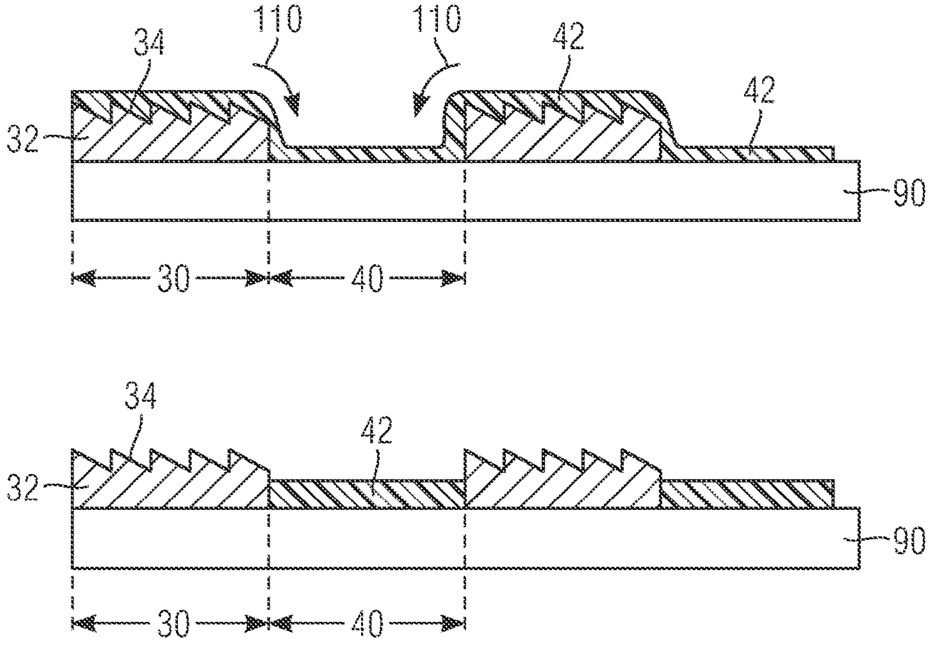
Fig. 12(a)
Fig. 12(b)
Fig. 12

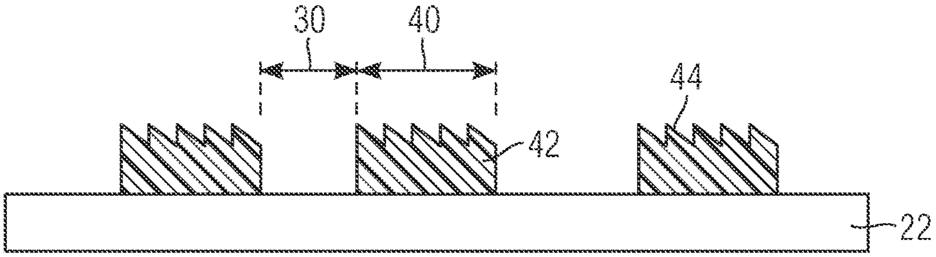
Fig. 14(a)
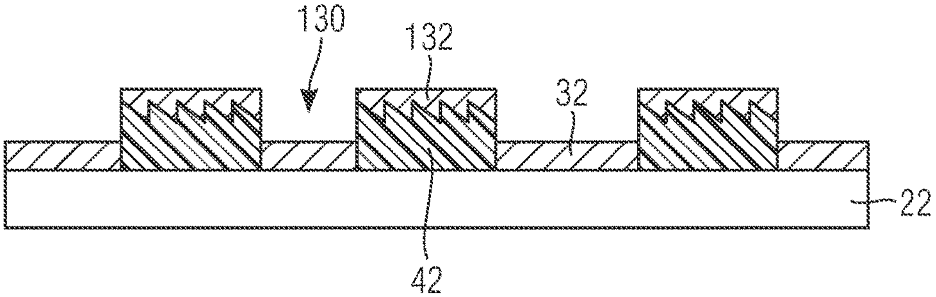
Fig. 14(b)
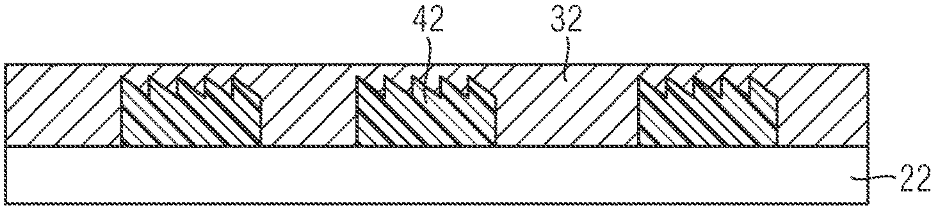
Fig. 14(c)
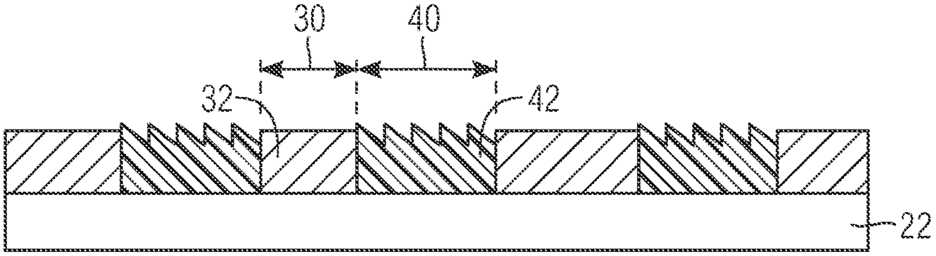
Fig. 14(d)
Fig. 14

OPTICALLY VARIABLE SECURITY ELEMENT, PRODUCTION PROCESS AND EMBOSSING ARRANGEMENT

BACKGROUND

The invention relates to an optically variable security element for safeguarding articles of value and to a production process for an optically variable security element of this kind. The invention also relates to embossing arrangements with a security element preproduct and means for impressing an embossed structure.

Data carriers, such as documents of value or of identity, and other articles of value too, such as branded goods, for instance, are often safeguarded by being provided with security elements which allow the authenticity of the data carriers to be verified and which at the same time serve as protection against unauthorized reproduction. The security elements may take the form, for example, of a security thread embedded in a banknote, a cover foil for a banknote with aperture, an applied security strip, a self-supporting transfer element, or else a feature region applied directly to a document of value.

Sometime ago, optically variable security elements were proposed which have two relief structures, arranged at different height levels and each provided with a colored coating, these structures being impressed in appropriately colored layers of embossing varnish; see WO 2020/011390 A1, WO 2020/011391 A1 and WO 2020/011392 A1. In these, however, in order to look at the lower-lying relief structure, the viewer is generally required to look through the embossing varnish layer of the higher-lying relief structure, and accordingly, depending on the desired optical sensation, there may be considerable restrictions affecting the coloring of the embossing varnishes, especially of the embossing varnish of the higher-lying embossing varnish layer.

SUMMARY

On this basis, the object for the invention is to specify a generic, optically variable security element having an attractive appearance and high anticounterfeit security, and also advantageous production processes for optically variable security elements of this kind.

To achieve the stated object, the invention comprises an optically variable security element which can be used in particular for safeguarding articles of value. The security element is equipped with a feature layer which comprises first and second feature regions arranged in register with one another in a common plane.

An in-register arrangement of the feature regions here refers in particular to an arrangement in which the first and second feature regions abut one another or are arranged at a predetermined, defined small distance from one another. A small distance is more particularly a distance of several micrometers or several tens of micrometers up to 100 μm and in certain applications up to 200 μm.

The first feature regions comprise a first embossing varnish layer composed of a first embossing varnish and impressed with an embossed structure which generates a first optical effect. The second feature regions comprise a second embossing varnish layer composed of a second embossing varnish impressed with an embossed structure which generates a second, different optical effect.

These first and second embossing varnishes have not only different solidification properties but also different optical properties.

The stated different solidification properties of the embossing varnishes may lie in different solidification processes each leading to solidification of the varnishes—in other words, in particular, a physical drying in the case of thermoplastic embossing varnishes or a radiation cure in the case of radiation-curing embossing varnishes. The different solidification properties may also lie in different solidification parameters for the same solidification process—in other words, for instance, in different softening temperatures in the case of thermoplastic embossing varnishes or in different radiation types, radiation intensities or irradiation times in the case of radiation-curing embossing varnishes. Radiation-curing embossing varnishes comprise, in particular, UV-curing embossing varnishes, those which cure by means of IR irradiation, and those which are electron beam-curing.

In one preferred embodiment, the first and second embossing varnishes are each formed by a thermoplastic embossing varnish having different softening temperatures, so that the embossing varnishes have different solidification properties on the basis of the different solidification parameter of 'temperature'. The softening temperatures differ preferably by more than 10° C. preferably by more than 25° C., more particularly by more than 50° C.

According to another, likewise advantageous embodiment, the first embossing varnish is formed by a radiation-curing, more particularly UV-curing embossing varnish and the second embossing varnish by a thermoplastic embossing varnish. While the first embossing varnish is therefore curable by exposure to radiation, the second embossing varnish is embossable at elevated temperature and solidifies on cooling, and so different solidification processes lead to the solidification of the varnishes.

As different optical properties, the first and second embossing varnishes may in particular have different color, different transparency and/or different luminescence. These embossing varnishes in one advantageous embodiment have a glazing coloration and are therefore not only colored but also partially translucent.

The UV embossing varnishes and thermoplastic varnishes (also called thermoplastics) that are used typically have the properties described below, although varnishes having differing properties may also be used for particular applications.

Typical UV embossing varnish is to start with much more readily embossable than thermoplastic embossing varnish. For UV embossing, for example, a liquid embossing varnish may first be applied to a foil. This is achieved without roll contact by the embossing tool. The foil with the embossing varnish is brought into contact with the embossing tool by means of an opposed roll, with the varnish surface taking on the structure of the embossing tool. In the case of a theoretical operation of infinite slowness, no pressure would be required: the varnish would simply flow into the structures and displace the air. In practice, however, the operation of embossing on the machine is not infinitely slow, and so if embossing is carried out with too low an opposed roll pressure, the varnish is no longer able to displace all of the air in the mandated time. Given certain requirements with regard to speed and absence of bubbles, therefore, operation takes place in practice with a certain embossing pressure. If no UV curing were to take place, the varnish would run immediately from the embossing tool again after contact with the embossing tool, after the removal of the foil. In practice, however, the foil has a certain wrap around the embossing tool. If the foil with the varnish has contact with the embossing tool by virtue of the opposed roll, the foil normally is no longer removed spontaneously from the embossing tool. Downstream of the opposed roll, in the actually unpressurized region, UV emitters are arranged which crosslink the UV varnish while it is still in contact with the embossing tool. Only after this reaction is the foil removed from the embossing tool. The entire operation is usually continuous. The varnish cured in this way is generally a thermoset.

Thermoplastic embossing generally proceeds differently from the UV embossing outlined. A thermoplastic at room temperature is solid and accordingly nonflowable, then at elevated temperature becomes embossable at a certain temperature. On further increased temperature, the varnish becomes tacky, thereby restricting the practicable embossability with a standard embossing tool. However, nonstick-coated tools may optionally be employed. In the case of thermoplastic embossing, for example, the embossing die may be heated, embossing carried out at elevated temperature, and the embossing die optionally cooled again somewhat prior to demolding. In the case of a roll-to-roll operation, there is generally no cooling prior to demolding. In that case, with thermoplastic embossing, for example, the film may be heated optionally with contact with the embossing tool and embossed and also demolded at maximum temperature without entering the tacky range of the thermoplastic. Heating to an extent such that the thermoplastic actually becomes liquid is advantageously avoided.

In order to prevent sticking of a low-melting thermoplastic, the embossing tool is advantageously provided with a nonstick coating. Alternatively, the unembossed embossing varnish may be provided with metallization to prevent sticking, or it is ensured that the higher-melting thermoplastic becomes more highly melting only at a later time. This may be ensured, for example, by means of the crosslinkers identified elsewhere (for example, isocyanates) or else by radiation crosslinking. For example, two thermoplastically embossable UV raw materials may be next to one another, with one of these two formulations comprising a photoinitiator. Exposure to light may be carried out after the first embossing—in that case, demolding is possible thereafter, since the solid varnish receives the embossed structure even without contact with the embossing tool. The formulation comprising the photoinitiator thereby increases in melting point and is no longer deformable under the previous embossing conditions. The second embossing may then be performed. The second "thermoplastic" either is left uncrosslinked or it is post-crosslinked by electron beam curing, as the latter operation may be performed without photoinitiators. Alternatively, the second thermoplastic may likewise comprise a photoinitiator, which is not activated at the wavelength(s) of the first emitter.

As well as the advantageous embodiments already mentioned for the embossing varnishes, it is in principle also possible to use embossing varnishes which cure or crosslink thermally rather than photochemically. For example, some embossing varnishes have a softening temperature $T_1$ and a curing temperature $T_2>T_1$. Embossing varnishes of these kinds may be formed on the basis, for example, of acrylates with isocyanates.

A further procedure lies in selective heating of one of the embossing varnishes. A region having a selectively excitable substance (in UV/visible/IR or electrically/capacitively/magnetically with alternating field) leads selectively only to the heating of the region comprising that substance. In this way, for example, two regions with UV embossing varnish may also be provided and processed, more particularly embossed, in succession.

With advantage, the embossed structures of the first and second embossing varnish layers each comprise structural elements having structural dimensions in the plane that lie between 30 μm and 200 μm, more particularly between 50 μm to 150 μm. One or both embossed structures advantageously comprise as structural elements micromirror arrangements with micromirrors featuring directed reflection, more particularly with nondiffractive mirrors, and preferably with planar mirrors, hollow mirrors and/or Fresnel-like mirrors.

The embossed structures of the first and second embossing varnish layers may advantageously adjoin one another directly, though it is also possible for a narrow transition region to be present between the embossed structures of the first and second embossing varnish layers, with the embossing height and/or embossing quality of one of the embossed structures decreasing in said region. The transition region preferably has a width of less than 10 μm, more particularly of less than 5 μm. In the transition region, for example, the shape of the embossed structures may be maintained, but the height of the embossed structures may decrease from a maximum value in the interior of the feature region to a minimum value at the margin of the feature region, bordering the subsequent feature region. The minimum value may also be zero here. In the transition region, the quality of the embossed structures may also be reduced relative to the interior of the feature region; there, for example, the structural elements of the embossing may be transferred only incompletely into the embossing varnish.

The embossing varnish layers of the first and second feature regions are advantageously arranged next to one another without gaps and overlaps.

The embossed structures of the first and second embossing varnish layers are advantageously substantially at the same height, meaning in particular that the average heights of the two embossed structures do not differ by more than the height difference within each embossed structure.

In one advantageous development, the first and second embossing varnish layers are provided with a common reflection-increasing coating, more particularly a high-refractive-index or metallic coating.

According to one advantageous embodiment, the security element has an easily deformable carrier foil, more particularly a carrier foil having a thickness of less than 23 μm, preferably a thickness of less than 19 μm and more preferably a thickness of between 6 μm and 15 μm. Also advantageously contemplated as an easily deformable carrier foil is a carrier foil having a glass transition temperature $T_g$ which is lower than the softening temperature of at least one thermoplastic embossing varnish of the feature layer.

According to a further advantageous embodiment, the security element comprises a compensating layer which is flexible, more particularly elastic, i.e. reversibly deformable at the softening temperature of at least one thermoplastic embossing varnish of the feature layer.

The compensating layer may be formed, for example, of a silicone rubber. Depending on the properties of the compensating layer, it may be advantageous to use the compensating layer as a middle layer in a sandwich construction comprising a carrier foil, the compensating layer and a thin covering layer, in order to ensure ready capacity for coating over by means of the concluding covering layer. The thin covering layer advantageously has a layer thickness of 3 to 6 μm, for example 4.5 μm. The layer thickness of the compensating layer is advantageously between about 2 and about 20 μm.

The compensating layer may also be formed by a foam or comprise a foam. Compensating layers of these kinds composed of or comprising foams are particularly flexible and compressible, but often exhibit light scattering at bubble boundaries and therefore generally have a somewhat lower transparency.

It will be appreciated that the optically variable security element may comprise further layers, such as protective, covering or additional functional layers, machine-readable elements, primer layers or heat-sealing varnish layers, which, however, do not constitute the essential elements of the present invention and are therefore not further described.

The security element is advantageously a security thread, more particularly a window security thread or a pendulating security thread, a tear thread, a security tape, a security strip, a patch or a label for application to a security paper, document of value, or the like.

The invention also comprises a process for producing an optically variable security element, wherein a feature layer is generated on a carrier and comprises, arranged in register with one another in a common plane, first and second feature regions.

In the process, in the first feature regions, a first embossing varnish layer composed of a first embossing varnish is applied and an embossed structure is embossed into the embossing varnish layer and generates a first optical effect.

In the second feature regions, a second embossing varnish layer composed of a second embossing varnish is applied and a second embossed structure is embossed into the embossing varnish layer and generates a second, different optical effect.

The first and second embossing varnishes applied in this case are each embossing varnishes which have not only different optical properties but also different solidification properties, and/or are solidified at different times. While the use of embossing varnishes having different solidification properties is presently preferred, it is also possible to use embossing varnishes having the same solidification properties, if they are solidified at different times. For example, UV embossing varnishes may be used as first and second embossing varnishes in each case, and the first UV embossing varnish may be solidified after UV embossing, then a second UV embossing varnish may be applied and this varnish may likewise be solidified after UV embossing. In this case, the embossing varnishes are solidified at different times, but may otherwise have the same solidification properties.

In one advantageous process variant, in the first feature regions, a first embossing varnish layer composed of a thermoplastic embossing varnish having a relatively high softening temperature and in the second feature regions a second embossing varnish layer composed of a thermoplastic embossing varnish having a lower softening temperature are applied, a first embossing step is carried out at relatively high temperature and in this case the first embossing varnish layer is provided with the first embossed structure, and subsequently a second embossing step is carried out at lower temperature and in this case the second embossing varnish layer is provided with the second embossed structure.

In another, likewise advantageous process variant, in the first feature regions, a first embossing varnish layer composed of a thermoplastic embossing varnish and in the second feature regions a second embossing varnish layer composed of a radiation-curing embossing varnish are applied, a first embossing step is carried out at relatively high temperature and in this case the first embossing varnish layer is provided with the first embossed structure, and subsequently a second embossing step at lower temperature is carried out with radiation exposure and in this case the second embossing varnish layer is provided with the second embossed structure and cured.

In all process variants, it is possible advantageously that in a first embossing step, the first embossing varnish layer is embossed and solidified, while the second embossing varnish layer remains deformable and runs partially or completely after the first embossing step.

In the case of another advantageous process variant, in the first feature regions, a first embossing varnish layer composed of a radiation-curing embossing varnish and in the second feature regions a second embossing varnish layer composed of a thermoplastic embossing varnish are applied, and the radiation-curing embossing varnish is provided with the first embossed structure in a first embossing step and cured, and subsequently a second embossing step is carried out and in this case the second embossing varnish layer is provided with the second embossed structure.

The second embossed structure in this case, in the second embossing step, is transferred only into the second embossing varnish layer, but not into the first embossing varnish layer.

With particular advantage, in the second embossing step, a flexible embossing tool, a resilient opposed embossing roll or a flexible compensating layer is used in the layer construction of the security element in order to transfer the second embossed structure only in the second embossing varnish layer. As a result, it is possible to ensure that the embossing in the second feature regions can be transferred into the second embossing varnish layer without damaging or destroying the first embossed structure already present. As explained in more detail later on below, the flexible embossing tool is able for this purpose to deform in the region of the cured first embossed structure, or the regions with the cured first embossed structure are able to be pressed sufficiently far into the resilient opposed embossing roll or the flexible compensating layer.

The invention further comprises an embossing arrangement comprising a security element preproduct for further processing to an optically variable security element of the type described above, having a feature layer which comprises, arranged in register with one another in a common plane, first and second feature regions, where the first feature regions comprise an embossing varnish layer composed of a solidified embossing varnish impressed with an embossed structure which generates a first optical effect, and the second feature regions comprise a second embossing varnish layer composed of an unsolidified embossing varnish, where the first and second embossing varnishes have not only different solidification properties but also different optical properties, and a flexible embossing tool having a second embossed structure, preferably for impressing an embossed structure which generates a second, different optical effect only into the embossing varnish layer with the unsolidified embossing varnish of the security element preproduct.

The flexible embossing tool here may be formed in particular of silicone rubber.

The invention, lastly, also comprises an embossing arrangement comprising a security element preproduct for further processing to an optically variable security element of the type described above, having a feature layer which comprises, arranged in register with one another in a common plane, first and second feature regions, where the first feature regions comprise an embossing varnish layer composed of a solidified embossing varnish impressed with an embossed structure which generates a first optical effect, and the second feature regions comprise a second embossing varnish layer composed of an unsolidified embossing varnish, where the first and second embossing varnishes have not only different solidification properties but also different optical properties, and a hard embossing tool having a second embossed structure and a resilient opposed embossing roll having a Shore hardness of less than 90, more particularly of less than 85, preferably for impressing an embossed structure which generates a second, different optical effect only into the embossing varnish layer with the unsolidified embossing varnish, the security element preproduct being embossed between the hard embossing tool and the resilient opposed embossing roll.

BRIEF DESCRIPTION OF THE DRAWINGS

Further exemplary embodiments and also advantages of the invention are explained below with reference to the figures; in the representation in the figures, the reproduction has not been true to scale or to proportion, in order to render them more descriptive.

In the figures.

DETAILED DESCRIPTION OF VARIOUS EMBODIMENTS

Figure 1:
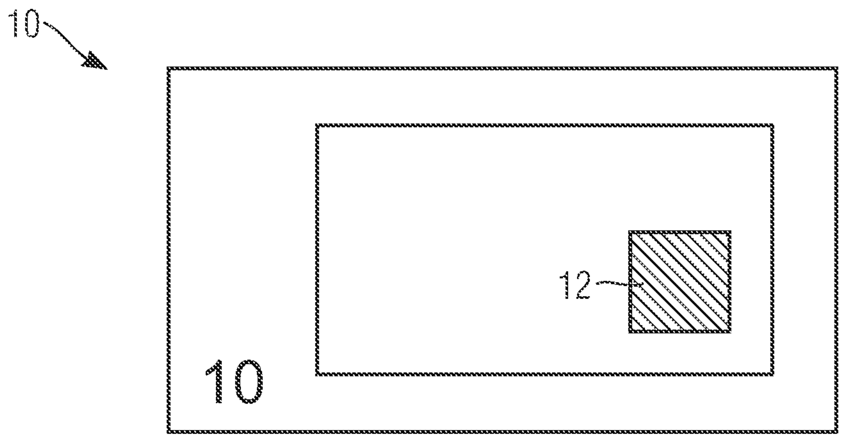
FIG. 1 shows a schematic representation of a banknote having an optically variable security element.

The invention is now elucidated on the example of security elements for banknotes. FIG. 1 for this purpose shows a schematic representation of a banknote 10 with an optically variable security element 12 in the form of an adhered transfer element. It will be appreciated, however, that the invention is not confined to transfer elements and banknotes, but that it is instead possible to use all kinds of security elements, in the context, for example, of labels on goods and packaging or of the safeguarding of documents, identity credentials, passports, credit cards, health insurance cards and the like. In the context of banknotes and similar documents, security threads or security strips, for example, are also contemplated as well as transfer elements (such as patches with or without their own carrier layer).

The security element 12, in spite of its flat formation, gives the viewer a three-dimensional sensation and also shows, for example, a binary switching of color and effect when the banknote 10 is tilted, with a first three-dimensional motif in a first color appearing from a first viewing direction and a second three-dimensional motif in a second color appearing from a second viewing direction.

These and numerous other visual effects may be generated advantageously with security elements for which, in one plane of the security element, two or more embossing varnish layers are arranged in register next to one another, and are provided in a targeted way with different, mutually independent embossed structures. As well as the different embossing, the embossing varnish layers advantageously also have other different properties, these being, in particular, different visual properties, such as different color, transparency and/or luminescence. In this way, the optically variable effects generated by the embossing, on the one hand, and the visual effects generated by the additional properties of the embossing varnish layers, on the other hand, can be harmonized with one another with perfect registration.

Figure 2:
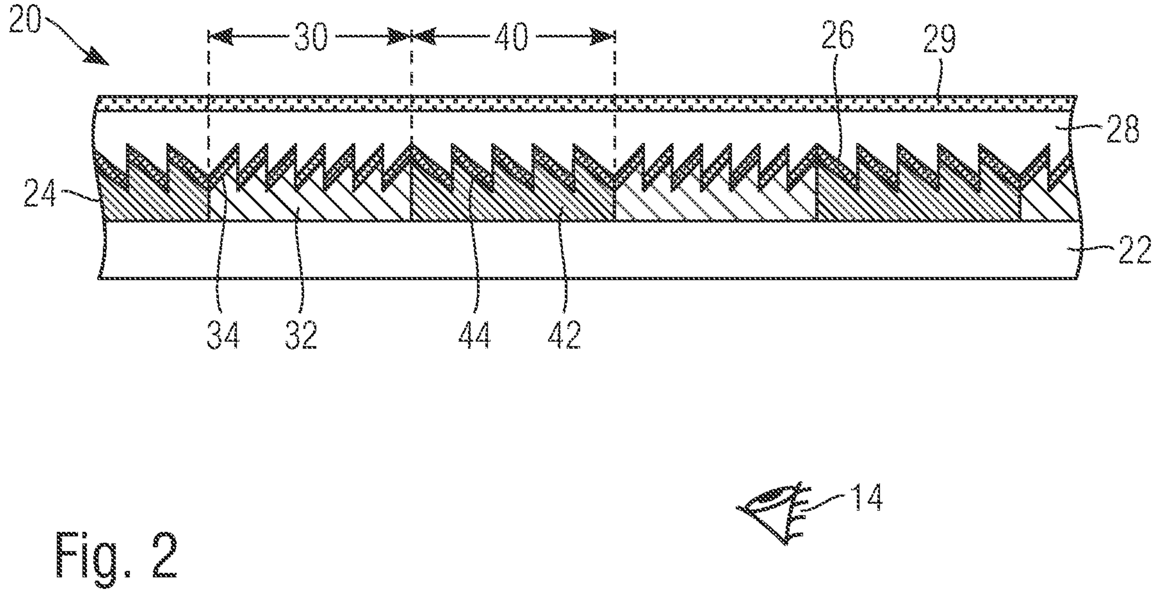
FIG. 2 shows in schematic representation a security element having a carrier substrate with an embossed feature layer, FIG. 3, including FIGS. 3(*a*) to 3(*d*), shows four intermediate steps in the production of a security element having a feature layer with two thermoplastic embossing varnishes differing in softening temperature, FIG. 4, including FIGS. 4(*a*) to 4(*d*), shows four intermediate steps in the production of a security element having a feature layer composed of a thermoplastic embossing varnish and a UV embossing varnish, FIG. 5, including FIGS. 5(*a*) to 5(*c*), shows intermediate steps in the production of a security element, using a flexible embossing tool, FIG. 6, including FIGS. 6(*a*) to 6(*c*), shows intermediate steps in the production of a security element, using a hard embossing tool in conjunction with a resilient opposed embossing roll, FIG. 7, including FIGS. 7(*a*) to 7(*c*), shows intermediate steps in the production of a security element whose layer construction includes a flexible compensating layer, FIG. 8, including FIGS. 8(*a*) to (*d*), shows intermediate steps in the application of two different embossing varnishes in a feature layer without register fluctuations next to one another, FIG. 9, including FIGS. 9(*a*) to 9*c*), shows intermediate steps in a different variant for the application of two different embossing varnishes in a feature layer without register fluctuations next to one another, FIG. 10, including FIGS. 10(*a*) to 10(*c*), shows intermediate steps in a further variant for the application of two different embossing varnishes in a feature layer without register fluctuations next to one another, FIG. 11, including FIGS. 11(*a*) and 11(*b*), shows intermediate steps in the application and high-resolution structuring of a UV embossing varnish layer, FIG. 12, including FIGS. 12(*a*) and 12(*b*), shows intermediate steps in the case of a further possibility of applying two different embossing varnishes in a feature layer without register fluctuations next to one another, FIG. 13, including FIGS. 13(*a*) to 13(*c*), shows intermediate steps in a process for registered application of two different embossing varnishes by means of mechanical layer ablation, and FIG. 14, including FIGS. 14(*a*) to 14(*d*), shows intermediate steps in a process for registered application of two different embossing varnishes by means of a selective ablation medium.

For illustration, FIG. 2 in a schematic representation shows a security element 20 having a carrier foil 22 in the form of a transparent PET foil, provided with an embossed feature layer 24. The feature layer 24 consists of an alternating sequence of feature regions 30, 40 of desired shape and size (only one of the feature regions in each case is provided with reference signs) which differ from one another not only in the different glazing coloration of the applied embossing varnish layers 32, 42 but also in the different formation of the respective embossed structures 34, 44.

The embossed structures 34, 44 of the two feature regions 30, 40 are in a common plane substantially at the same height level and are provided with a common reflection-increasing metal coating 26, an example being an aluminum layer applied by vapor deposition. In the exemplary embodiment, the metalized embossed structures are leveled by a varnish layer 28 and the security element can be adhered to the desired target substrate, such as the banknote 10, via an adhesive layer 29. After adhesion has taken place, the carrier substrate 22 may be peeled off or may remain as a protective foil in the security element.

The security element 20 is configured for viewing through the glazing embossing varnish layers 32, 42. Here, the viewer 14 in the feature regions 30 views the metalized embossed structures 34 through the embossing varnish layer regions 32, while in the feature regions 40 he or she views the metalized embossed structures 44 through the embossing varnish layer regions 42. For example, the embossing varnish 32 may have a glazing red coloration and the embossed structures 34 may generate, as their motif, a domed representation of the value "10", while the embossing varnish 42 has a glazing green coloration and the embossed structures 44 generate, as their motif, a domed representation of an emblem. The two motifs may also be recognizable from different viewing directions. As is evident from FIG. 2, the feature regions 30, 40 are arranged in register directly next to one another, without gaps or overlaps, with their different color effects generated by the embossing varnish layers 32, 42 and with their different motifs generated by the embossings 34, 44.

Figures 3, 3A, 3B, 3C, 3D:
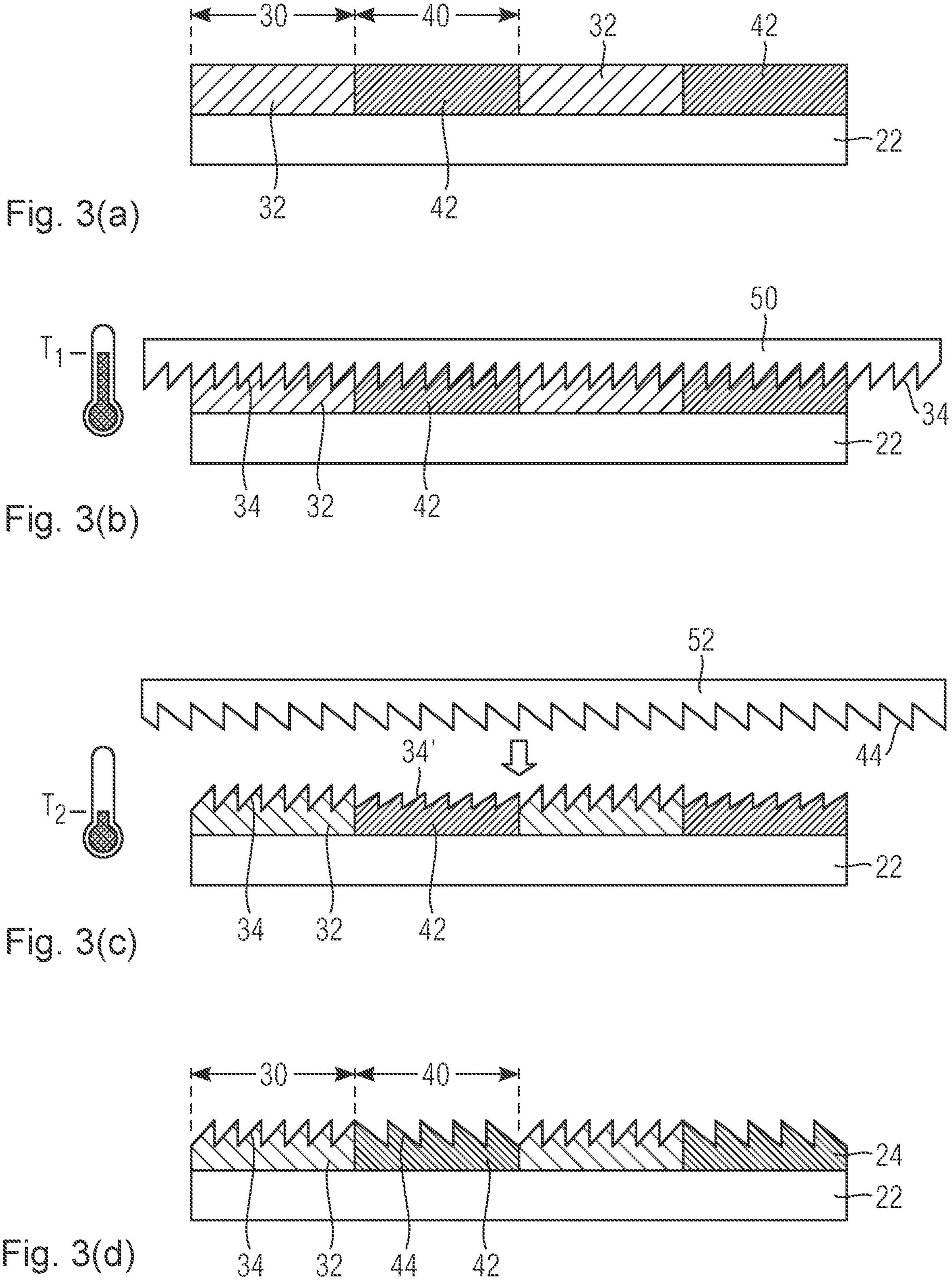

The basic principle of advantageous production of the feature layer 24 of the security element 20, for example, is now elucidated in more detail with reference to FIGS. 3 and 4, which each in (a) to (d) show four intermediate steps in the production of the security element 20.

First of all, with reference to FIG. 3(*a*), a carrier foil 22, for example a transparent, colorless PET foil, is provided and is coated in the desired feature regions 30, 40 with a respective thermoplastic embossing varnish 32 and 42 with the desired color effect. These thermoplastic embossing varnishes 32, 42 are harmonized with one another such that as well as the different colors they also have different softening temperature and are therefore embossable at different temperatures. For example, the thermoplastic embossing varnish 42 is already embossable at a relatively low temperature $T_2$, while the thermoplastic embossing varnish 32 is embossable only at a higher temperature $T_1>T_2$.

The two embossing varnishes 32, 42 are then provided in a first embossing step, which is carried out at a relatively high temperature $T_1$, using a first embossing tool 50, with the first embossed structure 34, as illustrated in FIG. 3(*b*).

The carrier foil with the embossed feature layer is then cooled to the lower temperature $T_2$ and demolded, and consequently the embossing varnish 32 is solidified in the feature regions 30 with the impressed embossed structure 34, while the embossing varnish 42 still remains deformable. After the demolding, therefore, the embossing varnish 42 will still partially or completely run and will take on the first embossing, albeit it incompletely, as suggested in FIG. 3(*c*) by the reference sign 34'.

Likewise represented in FIG. 3(*c*) is the second embossing tool 52 for the second embossing step, which is used to impress the second embossed structure 44 into the still deformable embossing varnish layer 42 of the feature regions 40 at the lower temperature $T_2$. The embossed structure 34 of the feature regions 30 has already solidified; especially because of the measures described in more detail below, the structure 34 is no longer substantially influenced by the second embossing step.

After the second embossing step, the carrier foil with the doubly embossed feature layer is cooled to a temperature $T<T_2$, to room temperature, for example, and as a result the embossing varnish 42 as well is solidified in the feature regions 40.

In this way, a feature layer 24 having the desired double embossing 34, 44, registered to the feature regions 30, 40, as represented in FIG. 3(*d*). The feature layer 24 can subsequently be metalized, as illustrated in FIG. 2, or the intermediate product of FIG. 3(*d*) may be otherwise processed further to give a desired security element.

In the embodiment of FIG. 4, instead of two thermoplastic embossing varnishes having different softening temperatures, a thermoplastic embossing varnish 32 and a UV embossing varnish 42 are employed. In contrast to the embodiments described later on below, in the case of the FIG. 4 configuration first the thermoplastic embossing varnish and only thereafter the UV embossing varnish are embossed. Although a UV embossing varnish is typically easier to emboss than a thermoplastic embossing varnish, it is also possible, when employing suitable embossing varnishes and/or under suitable conditions, to employ an embossing sequence as in FIG. 4.

With reference to FIG. 4(*a*), a carrier foil 22, for example a transparent, colorless PET foil, is provided and is coated in the feature regions 30 with a thermoplastic embossing varnish 32 and in the feature regions 40 with a UV embossing varnish 42, in each case with a desired, different color effect.

Then, in a first embossing step using a first embossing tool 50, under embossing conditions in which the thermoplastic embossing varnish 32 is embossable, the first embossed structure 34 is impressed, as illustrated in FIG. 4(*b*). The embossing conditions may comprise, for example, a temperature $T_1$ of 120° C. and high embossing pressure.

Thereafter, the carrier foil with the embossed feature layer is cooled to a temperature a lower temperature $T_2<T_1$ and demolded, and consequently the embossing varnish 32 is solidified in the feature regions 30. The lower temperature $T_2$ may be, for example, $T_2$=30° C. Under the embossing conditions in the first embossing step, the UV embossing varnish 42 is not embossed, and so after the first embossing step, in the feature regions 30 of the embossing varnish 32 provided with the embossed structure 34 and in the feature regions 40, the unembossed UV embossing varnish 42 is present, as represented in FIG. 4(*c*).

Likewise shown in FIG. 4(*c*) is the second embossing tool 52, which is used to impress the second embossed structure 44 into the UV-curable embossing varnish layer 42 of the feature regions 40 at the lower temperature $T_2$ and under UV irradiation 54. As a result of the curing of the embossing varnish layer 42 by means of the radiation from a UV-LED, it is possible to minimize the introduction of heat into the thermoplastic layer 32. Owing to the low temperature during the second embossing step and because of the measures described in more detail below, the embossed structure 34 already solidified in the feature regions 30 is not substantially influenced by the second embossing step.

After the second embossing step and the UV curing, the embossing varnish 42 is also solidified in the feature regions 40, and so, as in the case of FIG. 3, a feature layer 24 is obtained which has a desired double embossing 34, 44, registered to the feature regions 30, 40, as represented in FIG. 4(*d*).

In the case of the configurations described in connection with FIGS. 3 and 4, there are already both embossing varnish layers 32, 42 present on the carrier foil in the first embossing step. It is, however, also possible for the layer that is to be embossed later to be applied only after the layer that is to be embossed first has undergone embossing. In this case as well it is essential that the embossing of the layer embossed first is retained under the embossing conditions for the layer that is embossed later. This generally necessitates particular measures, which are now explained in more detail with reference to FIGS. 5 to 7.

One possibility for ensuring that the embossing of the first-embossed layer is not damaged or destroyed by the subsequent embossing step is to use a flexible embossing tool for the second embossing.

This is illustrated using the configuration of FIG. 5, in which the feature layer 24, similarly to that in the example of FIG. 4, comprises not only feature regions 30 with a thermoplastic embossing varnish 32 but also feature regions 40 with a UV embossing varnish 42. The structures to be respectively impressed 34 and 44 have structural dimensions $L_1$ and $L_2$ in the plane of 50 μm to 150 μm. The structural height is typically in an order of magnitude of a few micrometers.

In the FIG. 5 variant, the UV embossing varnish 42 is first provided with the desired second embossed structure 44 and then cured, as represented in FIG. 5(*a*). The thermoplastic embossing varnish 32 may likewise be embossed or it may have remained without an impressed structure, by running, as in FIG. 5(*a*).

The first embossed structure 34, then, is impressed by means of a flexible embossing tool 60 which on its surface carries the desired embossed structure 34. The flexible embossing tool 60 is formed of silicone rubber, for example, and deforms as a result of pressure peaks on a length scale $\lambda$ of a few micrometers. In the course of the embossing, the feature regions 40 with the already cured UV embossing varnish 42 bring about corresponding deformation 62 of the flexible embossing tool 60, so that on the one hand the already cured embossing varnish regions 42 are not damaged, but on the other hand embossing varnish 32 can be embossed in the feature regions 30 with the embossed structure 34, as illustrated in FIG. 5(*b*).

Given that the transition regions 64 in which the shape of the embossing tool 60 changes greatly have dimensions of the order of magnitude $\lambda \ll L_1, L_2$, and hence the transition regions 64 are much smaller than the structural dimensions of the embossings 34, 44, any possibly lower, deficient or even absent embossing in the transition regions 64 has no notable influence on the quality of the embossed structures 34 in the feature region 30 overall.

After the cooling of the thermoplastic embossing varnish 32 and the demolding of the flexible embossing tool 60, therefore, the feature layer 24 in the feature regions 30, 40 is provided with the desired in-register double embossing 34, 44, as represented in FIG. 5(*c*).

Figures 6, 6A, 6B, 6C:
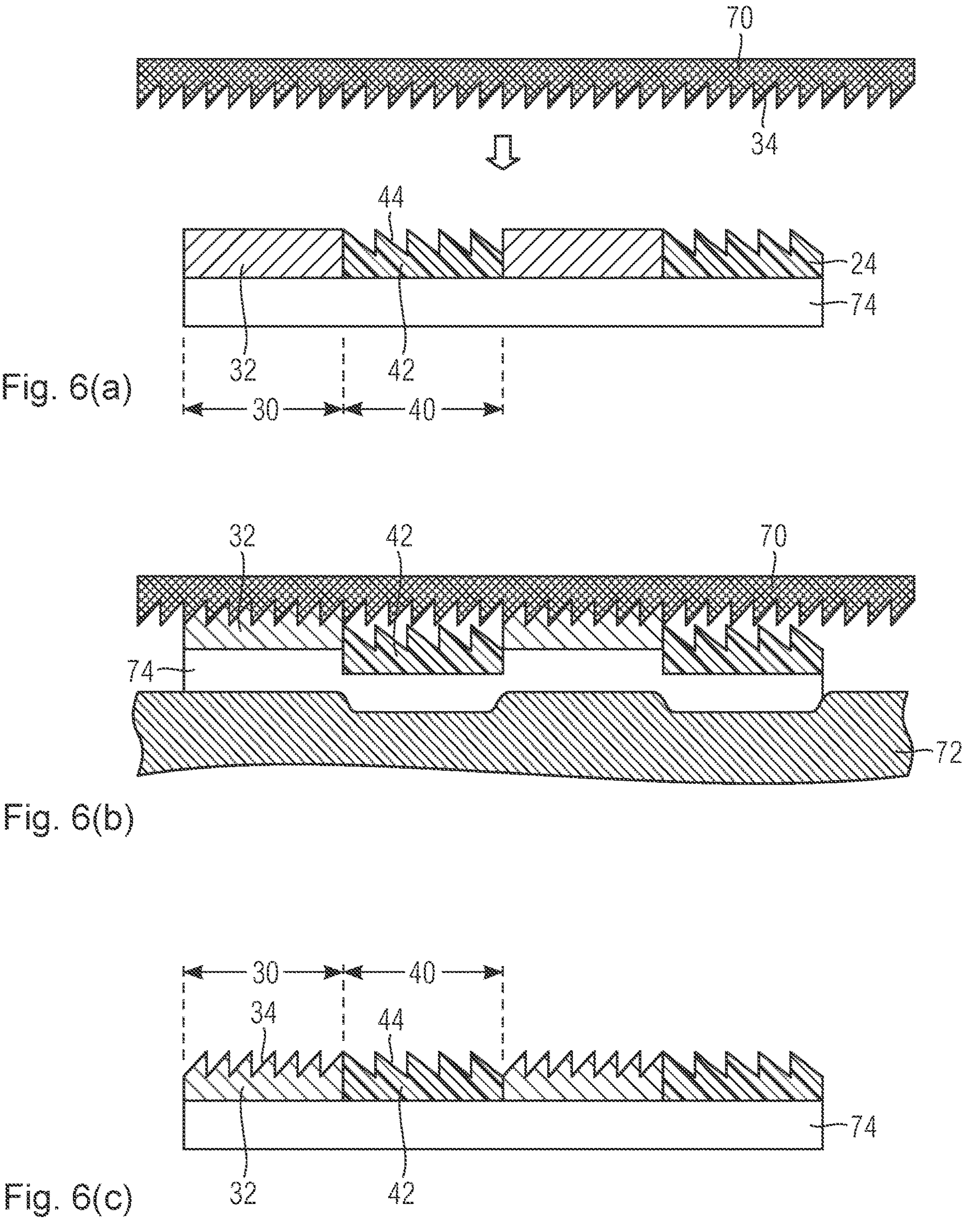

Another possibility, with reference to FIG. 6, lies in the use of a hard embossing tool 70 in conjunction with a resilient opposed embossing roll 72 and a suitable carrier foil 74 in the security element.

In the case of this configuration, the initial situation represented in FIG. 6(*a*) corresponds largely to the initial situation of FIG. 5(*a*)—in other words, a suitable carrier foil 74, described in more detail later on below, bears a feature layer 24, wherein a thermoplastic embossing varnish 32 is applied in feature regions 30 and a UV embossing varnish 42 in feature regions 40. This UV embossing varnish 42 has already been provided with a desired embossing 44 in a first embossing step. Here as well, the structures 34, 44 for impression have structural dimensions $L_1$ and $L_2$ respectively, in the plane that lie between 50 μm and 150 μm.

For the embossing of the embossed structure 34 in the second embossing step, in the case of the process of FIG. 6, a hard embossing tool 70 is used, which may consist of nickel, for example. The hard embossing tool 70 is particularly readily suitable for embossing thermoplastic varnish 32, but may compensate height differences less effectively than the flexible embossing tool 60 in the configuration of FIG. 5.

In order nonetheless to ensure that the varnish regions 42 already embossed and cured are not damaged or deformed in the second embossing step, the process exploits the fact that an embossing always requires an opposing pressure, which is applied in general by an opposed embossing roll 72. As a particular feature of the process of FIG. 6, a relatively resilient opposed embossing roll 72 is used, which consists of an elastomer having a hardness of less than 90 Shore, more particularly of less than 85 Shore.

As illustrated schematically in FIG. 6(*b*), in the second embossing step, the already cured UV embossing varnish regions 42 are pressed by the hard embossing tool 70, together with the carrier foil 74, into the resilient opposed embossing roll 72 to a sufficient extent to allow the embossing of the thermoplastic embossing varnish 32 to be performed without damage or destruction of the UV embossing varnish regions 42.

After the cooling and demolding of the thermoplastic embossing varnish 32, the feature layer 24 is then provided in the feature regions 30, 40 with the desired in-register double embossing 34, 44, as represented in FIG. 6(*c*).

As an alternative or as an addition to the use of a resilient opposed embossing roll 72, the opposed roll may also be equipped with a structured surface which locally limits deformation of the opposed roll. For example, the surface may be divided into independent cells having a characteristic dimension $\lambda_c \approx 25$ μm, so that, in the case of structural dimensions of the embossed structures 34, 44 of $L_1$, $L_2$=100 μm, for example, the likelihood is that in each case a plurality of, more particularly 9, cell segments are able to exert their ideal embossing pressure, while the segments next to them are highly deformed.

Coming back to the advantageous properties of the carrier foil 74, this foil, under the embossing conditions of the second embossing step, must be sufficiently easily deformable to allow the height compensation illustrated in FIG. 6(*b*) by virtue of the opposed embossing roll 72.

For this purpose, for example, a very thin carrier foil 74 may be used, having a thickness preferably of less than 23 μm, more particularly of less than 19 μm and very preferably of between 6 μm and 15 μm. Alternatively or additionally, the carrier foil 74 may also be tailored to the embossing conditions by the glass transition temperature $T_g$ of the carrier foil being exceeded under the embossing conditions of the second embossing step, with the foil therefore becoming particularly readily deformable.

A further possibility for ensuring that the first-embossed layer is not damaged or destroyed under the embossing conditions for the later-embossed layer is that of providing a compensating layer 80 in the layer construction of the security element itself.

For explanation, FIG. 7 shows the layer construction of the security element to be produced, where between a carrier foil 22 and the feature layer 24, a compensating layer 80 is provided which is flexible at least under the embossing conditions of the second embossing and in that case preferably has elastic properties. If provision is made for the optical effect of the security element to be viewed from the side of the embossing varnish layers 32, 42 and hence also through the compensating layer, then the compensating layer is preferably transparent with little scattering effect. Specifically, for example, the compensating layer 80 may be formed of a silicone rubber.

The initial situation represented in FIG. 7(*a*) corresponds largely to the initial situation in FIG. 6(*a*); in particular, the feature layer 24 in the feature regions 30 comprises a thermoplastic embossing varnish 32 and in the feature regions 40 comprises a UV embossing varnish 42, which has already been provided with a desired embossing 44 in a first embossing step.

For the embossing of the embossed structure 34 in the second embossing step, a hard embossing tool 70 may then be used which is especially readily suitable for embossing a thermoplastic varnish 32. With reference to the representation in FIG. 7(*b*), the second embossing step of the thermoplastic varnish 32 takes place at an elevated temperature at which the compensating layer 80 is elastic, so that the already cured UV embossing varnish regions 42 are pressed locally by the hard embossing tool 70 into the compensating layer 80. As a result, deformation or damage of the embossed structure 44 is prevented and at the same time embossing of the embossing varnish layer 32 is enabled.

In order to permit sufficient pressing-in of the UV embossing varnish regions 42, the layer thickness of the compensating layer 80 ought to be somewhat greater than the height difference to be compensated, which in the case of typical embossed microstructures 44 is generally between 2 to 15 μm. The compensating layer 80 may advantageously also deform in such a way that when the UV embossing varnish regions 42 are pressed in, at the same time the thermoplastic embossing varnish regions 32 are pressed somewhat upward and thereby support the second embossing. Deformation of this kind may in particular take place in a volume-maintaining manner.

On conclusion of the second embossing step and of the cooling and demolding of the thermoplastic embossing varnish 32, the deformation of the elastic compensating layer 80 is reversed, and so the feature layer 24 generated in the feature regions 30, 40 is provided with the desired in-register double embossing 34, 44, as represented in FIG. 7(*c*).

In the case of the configurations described so far, the starting situation has been one in which there are already in-register embossing varnish regions on a carrier foil in the feature regions 30, 40. Described below now are a number of advantageous possibilities for applying two or more different embossing varnishes in a feature layer without register fluctuations next to one another and so ideally without unintended gaps or overlaps.

Described first of all in this context are variants which exploit the phenomenon of surface energy or surface tension. Here, according to the material of the carrier foil used, it may be necessary first to provide said foil with a coating possessing a suitable surface energy. For this purpose, further layers may be required, such as a primer layer or a release layer for subsequent detachment, for example. For sufficient adhesion, a corona treatment, a plasma treatment or a flame treatment of the foil may also be useful. In the outlining below, it is assumed that the stated carrier 90 is or comprises a suitable carrier foil, and may have been appropriately pretreated or provided with further layers in order to provide a surface energy suitable for the respective process.

Figures 8, 8A, 8B, 8C, 8D:
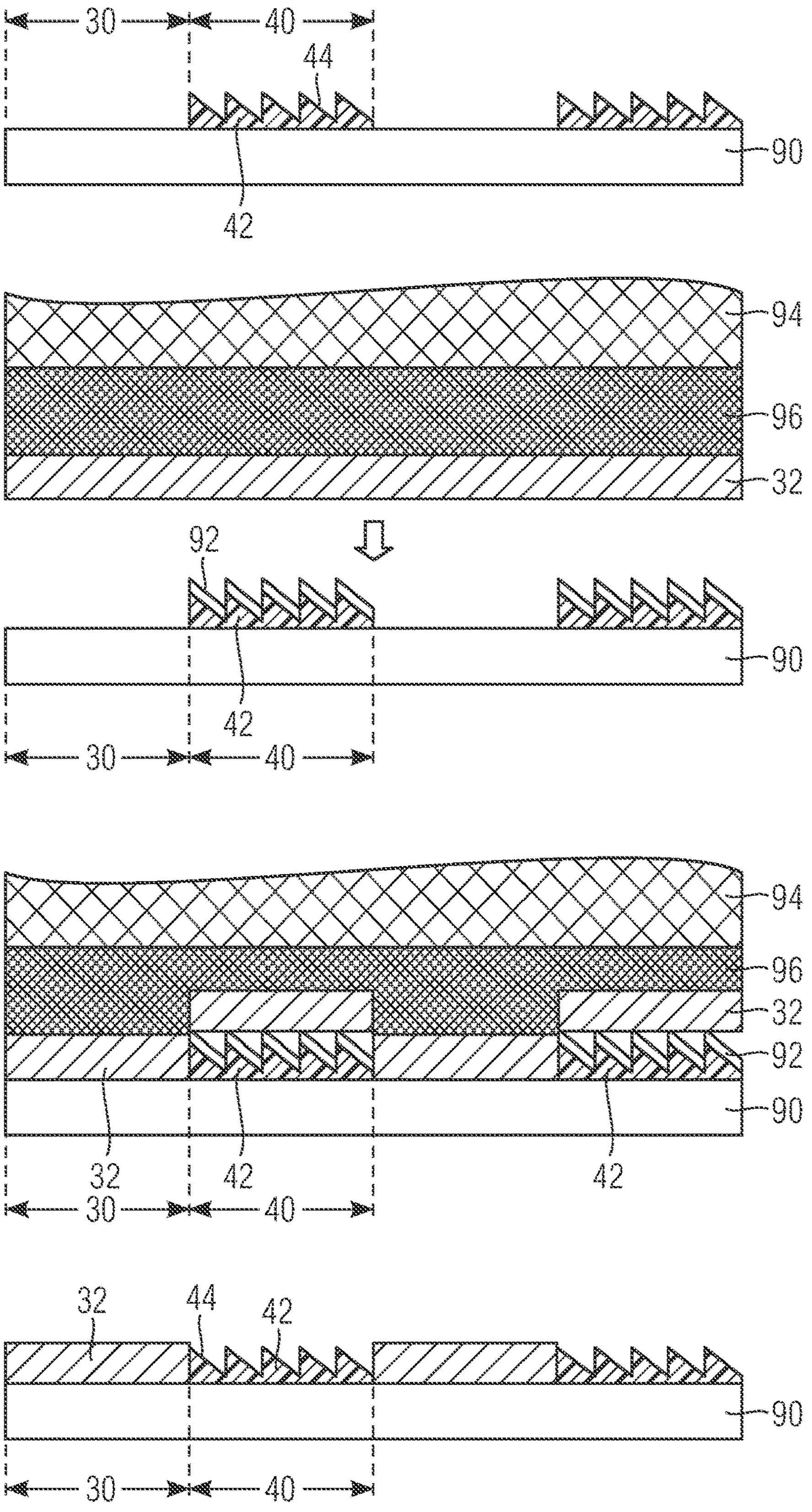

In the case of the process variant illustrated in FIG. 8, a carrier 90 is first printed in the feature regions 40, by any desired process, with an embossable formulation 42 which is hydrophilic after drying and which has the transparency or color desired in the feature regions 40. In the case of the configuration described, the formulation is a UV embossing varnish 42 which, after having been applied by printing, has been embossed in the feature regions 40 with the associated embossed structure 44 and lastly has been cured by UV crosslinking, as represented in FIG. 8(*a*). The feature regions 30 in this case are initially still uncoated and represent regions having a hydrophobic surface.

The carrier foil provided with the UV embossing varnish is then moistened in line or in a separate operation with a moistening agent 92. Here, only the hydrophilically coated feature regions 40 accept the moistening agent 92, while the hydrophobic feature regions 30 remain free of moistening agent, as illustrated in FIG. 8(*b*).

A second embossing varnish layer of a thermoplastic embossing varnish 32 is applied subsequently to the carrier foil, this being done in the exemplary embodiment using a printing cylinder 94 on which the embossing varnish layer 32 is provided over the full area, as shown in FIG. 8(*b*). To ensure that the embossing varnish 32 is applied only in the intermediate spaces 30 between the already coated regions 40, the surface of the printing cylinder 94 is equipped with a compressible element 96.

During the print application of the embossing varnish layer 32, the compressible element 96 deforms as a result of the pressure peaks generated by the already cured UV varnish layer 42, as represented in FIG. 8(*c*), and so the embossing varnish 32 enters into contact with the carrier 90 in the non-raised feature regions 30, where it is transferred without damage to the existing embossed structure 44. During print application, the UV embossing varnish 42 of the feature regions 40 is indeed likewise in contact with the embossing varnish layer 32, but by virtue of the previously applied moistening agent 92 it is ink-repellent and therefore does not accept the embossing varnish 32.

In this way, in the print application step, the thermoplastic embossing varnish 32 is laid down only in the feature regions 30, as represented in FIG. 8(*d*). In the feature regions 40, the already embossed and cured UV embossing varnish 42 is present. As described in connection with FIGS. 5 to 7, for example, the resulting intermediate product may then be processed further, and the embossing varnish layer 32 may also be provided here with the desired embossing. Instead of a thermoplastic embossing varnish, it is also possible to use a further UV embossing varnish, which may also have the same solidification properties as the first embossing varnish, since the first embossing varnish is already solidified when the further embossing varnish is applied by printing.

In the case of the process variant of FIG. 9, instead of a compressible element in the printing cylinder, a resilient opposed roll 98 is used which has a Shore hardness of less than 90, more particularly of less than 85.

The initial situation shown in FIG. 9(*a*) corresponds substantially to the initial situation of FIG. 8 and shows a carrier 90 which has been coated in feature regions 40 with a UV embossing varnish 42 that is hydrophilic after curing.

The UV embossing varnish 42 has been embossed with the desired embossed structure 44 and cured by UV crosslinking. The carrier foil thus coated was then moistened in line or in a separate operation with a moistening agent 92, with only the hydrophilically coated feature regions 40 accepting the moistening agent 92, while the uncoated feature regions 30 remain free of moistening agent.

A second embossing varnish layer of a thermoplastic embossing varnish 32 is subsequently provided over the full area on a printing cylinder 94. A resilient opposed roll 98 provides an opposing pressure for the printing application step, but because of its low hardness level of less than 90 or less than 85 Shore it is locally deformable by pressure peaks. As illustrated schematically in FIG. 9(*b*), when the embossing varnish layer 32 is applied by printing, the already cured UV embossing varnish regions 42 are pressed by the printing cylinder 94 together with the carrier foil 90 into the resilient opposed roll 98 to some extent, so that in the marking regions 30, the thermoplastic embossing varnish 32 comes into contact with the carrier foil 90, and is transferred there, without damage to the existing embossed structure 44.

While the UV embossing varnish regions 42 are likewise in contact with the embossing varnish layer 32, they are ink-repelling, owing to the applied moistening agent 92, and so do not accept the embossing varnish 32. The print application step therefore produces a configuration with unembossed thermoplastic embossing varnish 32 in the feature regions 30 and with embossed, cured UV embossing varnish 42 in the feature regions 40, and this configuration may be processed further as described above. Instead of a thermoplastic embossing varnish, it is possible here as well to use a further UV embossing varnish, which, since the first embossing varnish is already solidified when the further embossing varnish is applied by printing, can also have the same solidification properties as the first embossing varnish.

In the case of this variant, under the conditions of print application of the second embossing varnish 32, the carrier foil 90 must be sufficiently readily deformable to permit the height compensation, illustrated in FIG. 9(*b*), by the opposed roll 98. For this purpose, for example, a very thin carrier foil 90 may be used (thickness preferably less than 23 μm, more particularly 19 μm, more particularly thickness between 6 μm and 15 μm) and/or a carrier foil 90 having a low glass transition temperature may be used which exceeds the print application conditions for the second embossing varnish, so that the and the foil becomes particularly readily deformable.

Figures 10, 10A, 10B, 10C:
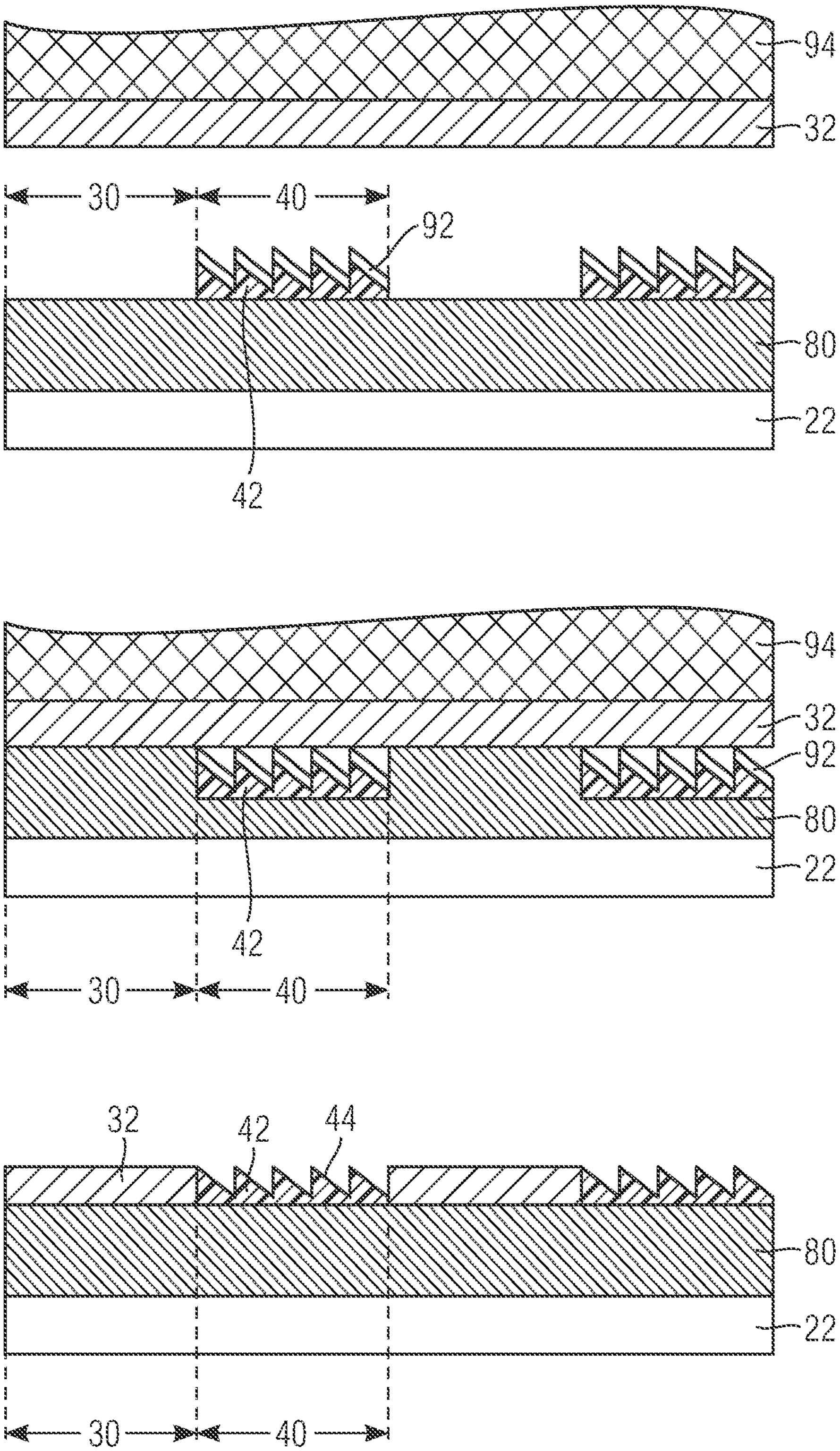

A further possibility lies in the provision of a compensating layer 80 in the layer construction of the securing element itself. With reference to FIG. 10, in the layer construction of the securing element to be produced, on the carrier foil 22, there is a compensating layer 80 arranged which at least under the conditions of print application of the embossing varnish layer 32 is flexible and preferably has elastic properties here.

Apart from the compensating layer, the initial situation shown in FIG. 10(*a*) corresponds to the initial situation of FIG. 9(*a*) and shows a carrier foil 22 having an applied compensating layer 80, composed of silicone rubber, for example, which has been coated in feature regions 40 with a UV embossing varnish 42 that is hydrophilic after curing. The compensating layer may also have been provided with a thin covering layer in order to facilitate the subsequent application of the embossing varnish layers 32, 42 and/or to provide a suitable surface energy. The UV embossing varnish 42 was embossed with the desired embossed structure 44 and cured by UV crosslinking. The carrier foil thus coated was then moistened in line or in a separate operation with a moistening agent 92, with only the hydrophilically coated feature regions 40 accepting the moistening agent 92, while the non-coated feature regions 30 remain free of moistening agent.

A second embossing varnish layer of a thermoplastic embossing varnish 32 is subsequently provided over the full area on a printing cylinder 94. As illustrated in FIG. 10(*b*), under the conditions of print application of the thermoplastic varnish 32, the compensating layer 80 is elastic, and so the already cured UV embossing varnish regions 42 are pressed locally by the printing cylinder 94 into the compensating layer 80. This prevents deformation or damage of the embossed structure 44 and enables trouble-free application of the embossing varnish layer 32 specifically into the intermediate spaces 30 between the UV embossing varnish regions 42.

In order to enable sufficiently deep pressing-in of the UV embossing varnish regions 42, the layer thickness for the compensating layer 80 ought to be somewhat greater than the height difference to be compensated, which is typically between 2 to 15 μm.

While the UV embossing varnish regions 42 are likewise in contact with the embossing varnish layer 32, they are ink-repelling, because of the applied moistening agent 92, and so do not accept the embossing varnish 32.

On conclusion of the print application step, the deformation of the elastic compensating layer 80 is reversed, and so the desired configuration shown in FIG. 10(*c*) is formed, with unembossed thermoplastic embossing varnish 32 in the feature regions 30 and embossed, cured UV embossing varnish 42 in the feature regions 40, and this configuration may be processed further as described above.

If the aim in the context of the configurations described is to achieve particularly high-resolution structuring of the UV embossing varnish layer 42, then the embossing varnish layer 42, instead of being print-applied with structuring as in the exemplary embodiments of FIGS. 8 to 10, may also be applied in an operation of residue-free embossing, as described in principle in publication EP 3 230 795 B1.

In order for such high-resolution, residue-free embossing to be successfully accomplishable, the surface energies of the carrier and of the embossing tool used, and the surface tension of the embossing varnish, must be harmonized with one another.

With reference to FIG. 11(*a*), in the stated process, a UV embossing varnish 42 is first applied over the full area to the carrier 90. A structured embossing tool 100 comprises tool regions 102, 104 which differ in height level and which correspond in their shape and size to the feature regions 30 (protruding tool regions 102) and 40 (recessed tool regions 104), respectively. The desired embossed structure 44 of the feature regions 40 is arranged in the recessed tool regions 104, which in the subsequent embossing step are further removed from the layer 42 to be embossed.

As the structured embossing tool 100 approaches the full-area embossing varnish layer 42, which is yet uncured, the geometry of the protruding regions 102 means that, by displacement, they reduce the layer thickness of the embossing varnish 42 in those regions. More precisely, owing to the wetting properties of the embossing varnish 42, the splitting coefficient, i.e. the interfacial energy between carrier 90 and embossing varnish 42 and between embossing varnish 42 and structured embossing tool 100, becomes negative, and so the embossing varnish 42 retreats from the feature regions 30 beneath the protruding tool regions 102 into the feature regions 40 beneath the recessed tool regions 104.

This tendency for wetting and dewetting is not only surface energy-dependent but also layer thickness-dependent. In the feature regions 30, the raised tool regions 102 of the embossing tool 100, therefore, as they approach, lead locally to a residue-free dewetting of the embossing varnish 42. The embossing varnish 42 which collects in the feature regions 40 is embossed there by the embossed structure 44 arranged in the recessed tool regions 104.

After the curing of the embossing varnish 42, therefore, the carrier foil 90 comprises the desired high-resolution structure with embossed, cured UV varnish regions 42 and, in between them, as yet uncoated feature regions 30, as represented in FIG. 11(*b*). Further processing may then take place as already described, for example, in connection with FIGS. 8 to 10.

According to a further process variant, which likewise utilizes the phenomenon of surface energy or surface tension, a layer of a first embossing varnish 32 is first applied by printing to a carrier 90, with reference to FIG. 12(*a*); after this varnish 32 has been dried or crosslinked, it has a particularly low surface energy. The first embossing varnish 32 applied by printing is embossed and dried or cured. The application of the first embossing varnish 32 here takes place in a structured manner, and so there are feature regions 30 with this first embossing varnish and as yet uncoated feature regions 40 without embossing varnish. In this context, it has proven advantageous if about half of the total area for coating is provided with the first embossing varnish 32.

Subsequently, a second embossing varnish formulation 42 is applied over the full area, having a low viscosity and a high surface tension. This corresponds to the situation of the intermediate step represented in FIG. 12(*a*). The second embossing varnish formulation 42 may be a UV embossing varnish, more particularly a water-thinnable formulation, which may need to be physically dried prior to embossing.

Because of its low viscosity and high surface tension, the second formulation 42 dewets from the first embossing varnish 32 of low surface energy, as indicated by the arrows 110 in FIG. 12(*a*), to produce, after the dewetting, the situation represented in FIG. 12(*b*). In the case of complete dewetting as illustrated in FIG. 12(*b*), the application of the second embossing varnish formulation 42 may also be repeated a number of times, so that material of high surface tension is built up successively in the feature regions 40, until the amount of second embossing varnish 42 that is present there is sufficient for the desired second embossing.

As well as the described exploitation of the phenomenon of surface energy and surface tension, there are also advantageous possibilities, based on layer ablation, for applying two or more different embossing varnish layers next to one another without register fluctuations, and these possibilities are now described in more detail in connection with FIGS. 13 and 14.

Figure 13:
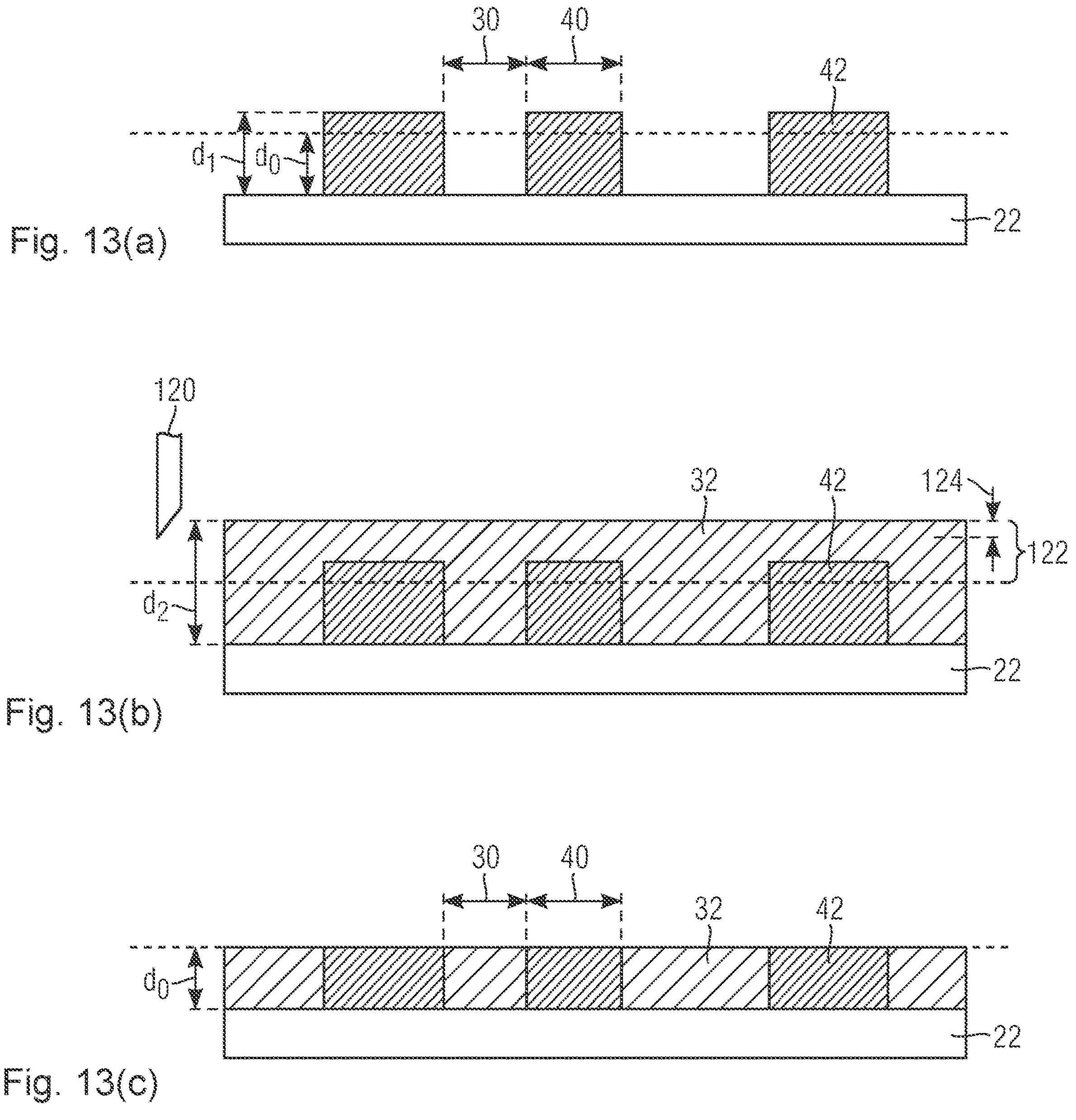

With reference first to FIG. 13, a first layer of a first thermoplastic embossing varnish 42 having a desired first coloration is applied in a structured manner to a carrier foil 22 and dried. The first embossing varnish 42 is applied in a structured manner in the pattern of the feature regions 40, but with a greater layer thickness $d_1$ than the layer thickness do actually required at the end, as shown in FIG. 13(*a*).

Then, over the full area, a second layer of a second thermoplastic embossing varnish 32 having a desired second coloration is applied.

As shown in FIG. 13(*b*), the second embossing varnish 32 is applied advantageously in a layer thickness $d_2>d_1$, although in principle it is sufficient for the second embossing varnish to be applied in a layer thickness $d_2>d_0$. The second embossing varnish 32 may also be applied in two or more steps and conjoined in each case with wiping or squeegeeing steps, in order to keep down the layer thickness of the second embossing varnish 32 on the embossing varnish regions 42 applied first.

After the solidification or the physical drying of the second embossing varnish 32, the resulting structure is mechanically ablated down to the desired layer thickness do, by milling 120 of the layer regions 122 projecting beyond the layer thickness do, for example. If the milling cutter 120 is adjusted to the desired target layer thickness, it is possible in the simplest case to mill down to this target layer thickness at which the two embossing varnishes 32, 42 are exposed in an arrangement exactly next to one another in the feature regions 30, 40, as shown in FIG. 13(*c*).

Precision adjustment and back-coupling of the milling step 120 may be performed by means of the milling ablation, in other words of the material removed from the layer regions 122. As illustrated in FIG. 13(*b*), to start with during milling, with a layer ablation 124 that is still small, only material of the higher-lying second embossing varnish 32 is removed; only at greater layer ablation is material of the first embossing varnish 42 ablated as well. Through spectroscopic investigation or else, optionally, by simply checking the color of the milling ablation, therefore, it is possible to supervise a desired depth of ablation. This makes it possible to ensure that the excess of the second embossing varnish 32, which is present on the first embossing varnish regions 42, is ablated completely and the end position shown in FIG. 13(*c*) is reliably achieved.

In the case of the further configuration of FIG. 14, the feature layer 24 is generated using two different embossing varnishes, of which one is soluble in an ablation medium and the other is insoluble.

With reference first of all to FIG. 14(*a*), a UV embossing varnish 42 of a first color is first applied in a structured manner to a carrier foil 22, in feature regions 40. The UV embossing varnish 42 is typically embossed with the desired embossed structure 44 and cured. The feature regions 30 that lie between the embossing varnish regions 42 ideally remain completely uncoated.

A thermoplastic embossing varnish 32 with a second color is subsequently provided, for which a matching ablation medium exists, allowing the dried embossing varnish 32 to be removed with a well-defined ablation rate, said medium nevertheless not dissolving the UV embossing varnish 42.

With this embossing varnish 32, a second layer is applied over the full area to the carrier foil 22, as represented in FIG. 14(*b*). Application may take place, for example, by flexographic printing, in which case the flexosleeve at high pressure already presses a considerable part of the embossing varnish 32 into the indentations 130 between the already cured UV embossing varnish regions 42, and only a relatively small amount of ink comes to lie on the embossing varnish regions 42.

Immediately after the application of the embossing varnish 32, the latter is still liquid, and so the excess can be wiped off or squeegeed off from the printed foil and hence can be removed in particular from the already cured embossing varnish regions 42. After a physical drying of the embossing varnish 32, the indentations 130 between the already cured UV embossing varnish regions 42 are partly filled, as represented in FIG. 14(*b*). On the embossing varnish regions 42 as well there is generally a thin tinting film 132 composed of embossing varnish material.

The application of embossing varnish 32 and the removal of excess material are repeated until the indentations 130 are sufficiently filled or even overfilled, as represented in FIG. 14(*c*). The repetition improves the relationship between the fill level of the indentations 130 and the unwanted tinting 132 of the embossing varnish regions 42. In this case it may be advisable to vary the ink concentration in the embossing varnish 32 during the graduated filling operation, in particular toward an increasingly low ink concentration, since the process of wiping or squeegeeing also reduces the tinting of the penultimate application step in each case and hence the proportion of the unwanted ink on the embossing varnish regions 42 is reduced.

Following the last repetition of the application and removal by wiping or squeegeeing, the thermoplastic embossing varnish 32 is dried physically, producing the situation shown in FIG. 14(*c*).

Subsequently, a developing step with the associated ablation medium is performed for the embossing varnish 32. The ablation medium may be aqueous, have a defined pH, or else be solvent-based. In this context, it may be necessary to expose the embossing varnish 32 to light prior to the ablation.

As soon as the ablation medium has sufficiently ablated the embossing varnish 32 to expose the embossing varnish regions 42, the ablation operation is halted, by rinsing with a further medium, for example. The cured UV embossing varnish 42 is not ablated by the ablation medium for the embossing varnish 32, and so the exposing takes place with a high selectivity.

After the end of the ablation step, the carrier foil 22 bears the desired structure with feature regions 40 having the embossed UV embossing varnish layer 42 of the first color and with feature regions 30 in between with the as yet unembossed thermoplastic embossing varnish layer 32 having the second color, as shown in FIG. 14(*d*). Further processing may take place, for example, by the procedure already described.

Instead of the UV embossing varnish 42, it is also possible to use a further thermoplastic embossing varnish in the procedure of FIG. 14. This further varnish may be insoluble from the start in the ablation medium of the embossing varnish 32, or it may comprise a crosslinker which renders it insoluble for the ablation medium of the embossing varnish 32, but whose crosslinking reaction at the time of the first embossing has not yet progressed to an extent that it would prevent embossing. A crosslinker of this kind may be, for example, an isocyanate, with the use of aliphatic isocyanates leading to a relatively slow reaction if the embossing is to take place with a certain time lag after the application step.

The application of the first embossing varnish layer 42 may be accomplished by applying a desired motif in a structured manner to the feature regions 40. Particularly in the case of UV embossing varnishes, however, it is also possible first to apply the embossing varnish layer over the full area and then to structure it in the manner desired. Advantageous possibilities for this, particularly for the high-resolution structuring of a UV embossing varnish layer, have already been outlined early on above. If the first embossing varnish layer applied is a thermoplastic embossing varnish, then successful precision structuring with sufficient layer thickness may necessitate printing at elevated temperature or from the melt.

Before and/or after the embossing of the first embossing varnish layer 42, a further process step may be provided by which the embossing varnish is converted into a stable and/or embossable form. This step may be, for example, a light-exposure step or a heating step. Provision may also be made for wet-chemical treatment, where the embossing varnish is contacted with a liquid medium in order to bring about curing and/or crosslinking.

The invention claimed is:

1. An optically variable security element for safeguarding articles of value, having a feature layer which comprises, arranged next to one another substantially at a same height level and in register with one another in a common plane, first and second feature regions, where:

the first feature regions comprise a first embossing varnish layer composed of a first embossing varnish and impressed with an embossed structure which generates a first optical effect, and the second feature regions comprise a second embossing varnish layer composed of a second embossing varnish and impressed with an embossed structure which generates a second, different optical effect, and the first and second embossing varnishes have not only different solidification properties but also different optical properties.

2. The security element according to claim 1, wherein the first and second embossing varnishes are each formed by a thermoplastic embossing varnish with different softening temperatures.

3. The security element according to claim 1, wherein the first embossing varnish is formed by a radiation-curing embossing varnish and the second embossing varnish is formed by a thermoplastic embossing varnish.

4. The security element according to claim 1, wherein the first and second embossing varnishes have different color, different transparency and/or different luminescence.

5. The security element according to claim 1, wherein the embossed structures of the first and second embossing varnish layers each have structural dimensions in the plane that lie between 30 μm and 200 μm.

6. The security element according to claim 1, wherein between the embossed structures of the first and second embossing varnish layers there is a narrow transition region having a width of less than 10 μm in which an embossed height and/or embossed quality of one of the embossed structures decreases.

7. The security element according to claim 1, wherein the embossing varnish layers of the first and second feature regions are arranged next to one another without gaps and overlaps.

8. The security element according to claim 1, wherein the first and second embossing varnish layers are provided with a common reflection-increasing coating.

9. The security element according to claim 1, wherein the security element has a deformable carrier foil having a thickness of less than 23 μm or a carrier foil having a glass transition temperature Tg which is lower than a softening temperature of at least one thermoplastic embossing varnish of the feature layer.

10. The security element according to claim 1, wherein the security element comprises a compensating layer which is flexible, at a softening temperature of at least one thermoplastic embossing varnish of the feature layer.

11. An embossing arrangement comprising:

a security element preproduct for further processing to an optically variable security element according to claim 1, having a feature layer which comprises, arranged next to one another substantially at the same height level and in register with one another in a common plane, first and second feature regions, where the first feature regions comprise an embossing varnish layer composed of a solidified embossing varnish impressed with an embossed structure which generates a first optical effect, and the second feature regions comprise a second embossing varnish layer composed of an unsolidified embossing varnish, where the first and second embossing varnishes have not only different solidification properties but also different optical properties, and a flexible embossing tool having a second embossed structure for impressing an embossed structure which generates a second, different optical effect only into the embossing varnish layer with the unsolidified embossing varnish of the security element preproduct.

12. The embossing arrangement according to claim 11, wherein the flexible embossing tool is formed of silicone rubber.

13. An embossing arrangement comprising:

a security element preproduct for further processing to an optically variable security element according to claim 1, having a feature layer which comprises, arranged next to one another substantially at the same height level and in register with one another in a common plane, first and second feature regions, where the first feature regions comprise an embossing varnish layer composed of a solidified embossing varnish impressed with an embossed structure which generates a first optical effect, and the second feature regions comprise a second embossing varnish layer composed of an unsolidified embossing varnish, where the first and second embossing varnishes have not only different solidification properties but also different optical properties, and a hard embossing tool having a second embossed structure and a resilient opposed embossing roll having a Shore hardness of less than 90 for impressing an embossed structure which generates a second, different optical effect only into the embossing varnish layer with the unsolidified embossing varnish, the security element preproduct being embossed between the hard embossing tool and the resilient opposed embossing roll.

14. A process for producing an optically variable security element wherein on a carrier a feature layer is generated which comprises, arranged next to one another substantially at a same height level and in register with one another in a common plane, first and second feature regions, where, in the process, in the first feature regions, a first embossing varnish layer composed of a first embossing varnish is applied and an embossed structure is embossed into the embossing varnish layer and generates a first optical effect, and in the second feature regions, a second embossing varnish layer composed of a second embossing varnish is applied and a second embossed structure is embossed into the embossing varnish layer and generates a second, different optical effect, and where embossing varnishes applied as first and second embossing varnishes each have not only different optical properties but also different solidification properties, and/or are solidified at different times.

15. The process according to claim 14, wherein in the first feature regions, a first embossing varnish layer composed of a thermoplastic embossing varnish having a first softening temperature and in the second feature regions a second embossing varnish layer composed of a thermoplastic embossing varnish having a second softening temperature that is lower than the first softening temperature are applied, a first embossing step is carried out at a first curing temperature and in this case the first embossing varnish layer is provided with the first embossed structure, and subsequently a second embossing step is carried out at a second curing temperature that is lower than the first curing temperature and in this case the second embossing varnish layer is provided with the second embossed structure.

16. The process according to claim 14, wherein in the first feature regions, a first embossing varnish layer composed of a thermoplastic embossing varnish and in the second feature regions a second embossing varnish layer composed of a radiation-curing embossing varnish are applied, a first embossing step is carried out at a first temperature and in this case the first embossing varnish layer is provided with the first embossed structure, and subsequently a second embossing step at a second temperature that is lower than the first temperature is carried out with radiation exposure and in this case the second embossing varnish layer is provided with the second embossed structure and cured.

17. The process according to claim 14, wherein in a first embossing step, the first embossing varnish layer is embossed and solidified, while the second embossing varnish layer remains deformable and runs partially or completely after the first embossing step.

18. The process according to claim 14, wherein in the first feature regions, a first embossing varnish layer composed of a radiation-curing embossing varnish and in the second feature regions a second embossing varnish layer composed of a thermoplastic embossing varnish are applied, and the radiation-curing embossing varnish is provided with the first embossed structure in a first embossing step and cured, and subsequently a second embossing step is carried out and in this case the second embossing varnish layer is provided with the second embossed structure.

19. The process according to claim 18, wherein in the second embossing step, the second embossed structure is transferred only into the second embossing varnish layer.

20. The process according to claim 18, wherein in the second embossing step, a flexible embossing tool, a resilient opposed embossing roll or a flexible compensating layer is used in a layer construction of the security element in order to transfer the second embossed structure only in the second embossing varnish layer.

* * * * *